US012221334B2

(12) United States Patent
Van Der Heijden et al.

(10) Patent No.: US 12,221,334 B2
(45) Date of Patent: Feb. 11, 2025

(54) VALVE INTERCONNECTOR

(71) Applicant: Diversey, Inc., Fort Mill, SC (US)

(72) Inventors: Lambertus Van Der Heijden, Bunnick (NL); Derk Reilink, Bosch en Duin (NL)

(73) Assignee: DIVERSEY, INC., Fort Mill, SC (US)

( * ) Notice: Subject to any disclaimer, the term of this patent is extended or adjusted under 35 U.S.C. 154(b) by 204 days.

(21) Appl. No.: 18/015,419

(22) PCT Filed: Jul. 2, 2021

(86) PCT No.: PCT/US2021/040247
§ 371 (c)(1),
(2) Date: Jan. 10, 2023

(87) PCT Pub. No.: WO2022/010766
PCT Pub. Date: Jan. 13, 2022

(65) Prior Publication Data
US 2023/0234825 A1 Jul. 27, 2023

Related U.S. Application Data

(60) Provisional application No. 63/050,197, filed on Jul. 10, 2020.

(51) Int. Cl.
*B67D 1/08* (2006.01)
*B67D 7/02* (2010.01)
(Continued)

(52) U.S. Cl.
CPC ......... *B67D 1/0832* (2013.01); *B67D 7/0288* (2013.01); *F16L 35/00* (2013.01); *F16L 37/35* (2013.01); *F16L 2201/20* (2013.01)

(58) Field of Classification Search
CPC .. B67D 1/0831; B67D 1/0832; B67D 7/0288; B67D 7/0294; F16L 35/00; F16L 37/35; F16L 2201/20
See application file for complete search history.

(56) References Cited

U.S. PATENT DOCUMENTS 3,599,843 A * 8/1971 Johnston .............. B67D 1/0832
222/400.7
3,868,049 A * 2/1975 Johnston .............. B67D 1/0832
222/400.7
(Continued)

FOREIGN PATENT DOCUMENTS

DE 202015100368 U1 3/2015
EP 1318100 A1 6/2003
(Continued)

OTHER PUBLICATIONS

International Search Report and Written Opinion for International Application No. PCT/US2021/040247 dated Oct. 7, 2021; 12 pages.
(Continued)

*Primary Examiner* — J C Jacyna
(74) *Attorney, Agent, or Firm* — LORENZ & KOPF, LLP

(57) ABSTRACT

Valve interconnector (1), suitable for use in combination with a receiver interconnector to couple a first hollow body associated to the valve interconnector to a second hollow body associated to the receiver interconnector, wherein the valve interconnector comprises a neck (7) to be secured to the first hollow body, a passageway (77) through the neck to allow fluid communication between the first hollow body and the second hollow body. The valve interconnector further comprises abase cap (8) secured to the neck, a valve assembly (5) secured to the base cap, the valve assembly being configured to assume at least a closed position and at least an open position. The valve interconnector further comprises a sealing ring (3) configured to provide a leak-proof connection between the valve interconnector and the receiver interconnector. The valve interconnector further comprises a code ring cap (9), wherein the code ring cap (9) further comprises a head portion (99) covering at least a portion of the external surface of the head portion (89) of the base cap (8), the head portion (99) of the code ring cap (9)

(Continued)

comprising a sealing ring enclosing portion (91) configured to cooperate in retaining the sealing ring (3) within the sealing ring seat (2).

17 Claims, 10 Drawing Sheets

(51) Int. Cl.
  *F16L 35/00* (2006.01)
  *F16L 37/35* (2006.01)

(56) References Cited

U.S. PATENT DOCUMENTS

| | | | | |
|---|---|---|---|---|
| 5,957,328 | A * | 9/1999 | Osgar | B67D 7/344 |
| | | | | 222/105 |
| 6,286,730 | B1 * | 9/2001 | Amidzich | B67D 1/125 |
| | | | | 137/212 |
| 6,390,156 | B1 * | 5/2002 | Hetherington | A23G 9/28 |
| | | | | 141/2 |
| 6,516,839 | B1 * | 2/2003 | Timp | B67D 1/0832 |
| | | | | 141/2 |
| 2011/0225789 | A1 | 9/2011 | Darnell | |
| 2022/0349503 | A1 * | 11/2022 | Durieux | F16L 37/02 |
| 2023/0235840 | A1 * | 7/2023 | Van Der Heijden | F16L 37/113 |
| | | | | 251/149.6 |

FOREIGN PATENT DOCUMENTS

| | | | |
|---|---|---|---|
| EP | 1884480 | A2 | 2/2008 |
| EP | 2974999 | A2 | 1/2016 |
| EP | 3295919 | A1 | 3/2018 |
| GB | 2479467 | A | 10/2011 |
| IT | 20180001167 | A1 | 7/2019 |
| WO | 2016/138053 | A1 | 9/2016 |
| WO | 2017/031584 | A1 | 3/2017 |

OTHER PUBLICATIONS

International Search Report and Written Opinion for International Application No. PCT/US2021/040249 dated Oct. 4, 2021; 12 pages.
Co-pending U.S. Appl. No. 18/015,420, filed Jan. 10, 2023 for Valve Interconnector.

* cited by examiner

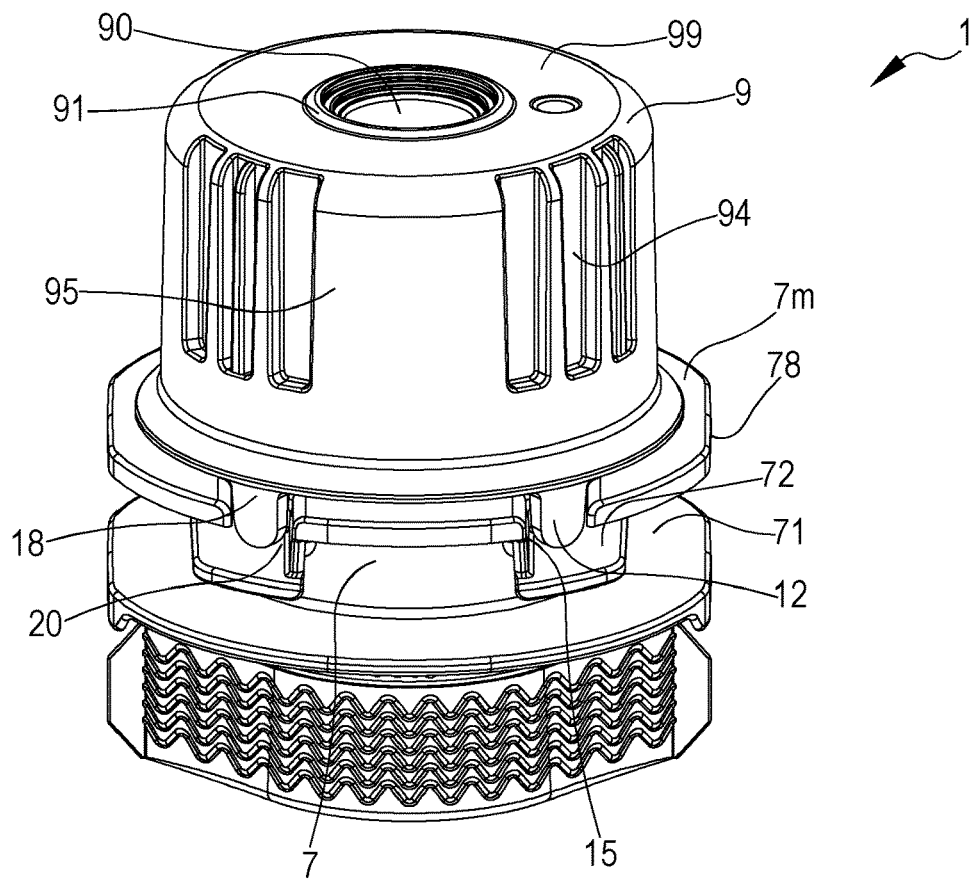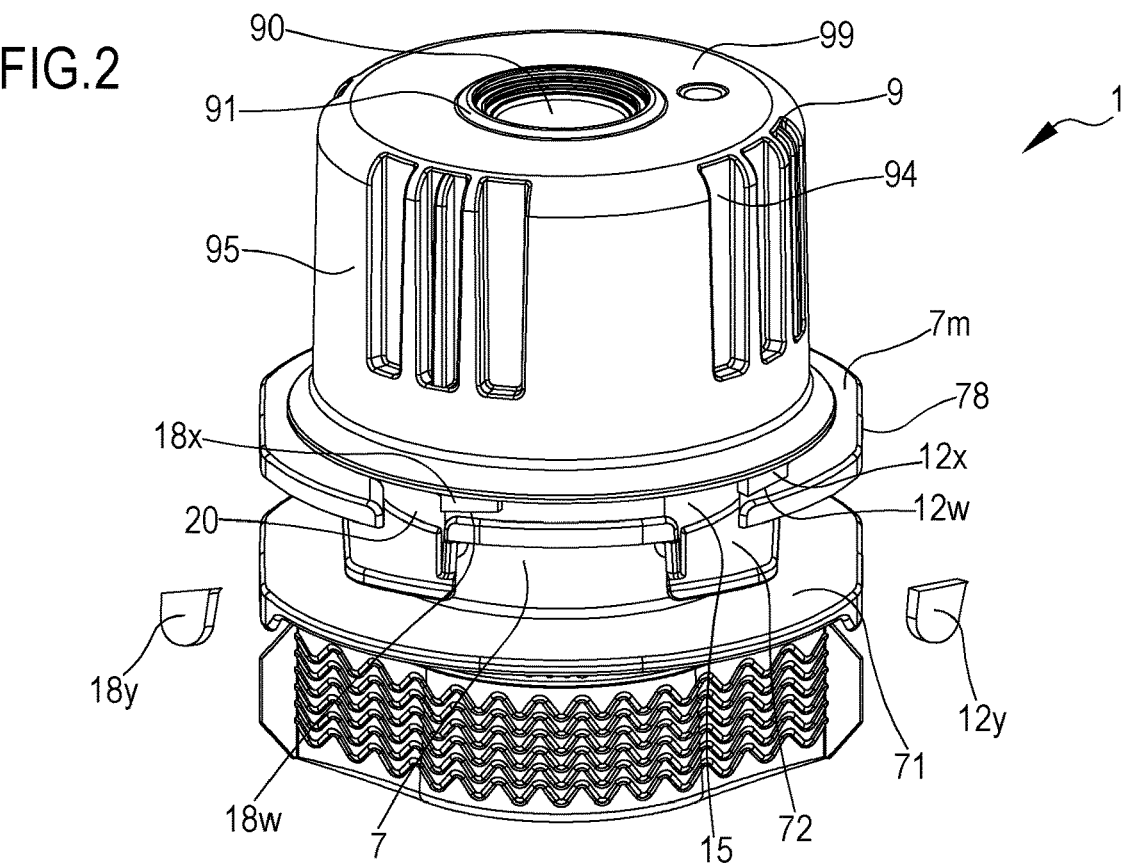

VALVE INTERCONNECTOR

CROSS-REFERENCE TO RELATED APPLICATIONS

The present application is a National Phase of PCT International Application No. PCT/US2021/040247, filed Jul. 2, 2021, which claims priority to U.S. Provisional Patent Application Ser. No. 63/050,197, filed Jul. 10, 2020. The present application is also related to co-pending application Ser. No. 18/015,420 filed on the same date as the present application by the same inventors which is a National Phase of PCT International Application No. PCT/US2021/040249 filed Jul. 2, 2021, which claims priority to U.S. Provisional Patent Application Ser. No. 63/050,202 filed Jul. 10, 2020. The content of these patent applications are incorporated by reference herein.

TECHNICAL FIELD

The invention relates to a valve interconnector suitable for use, in combination with a receiver interconnector, in an interconnector system configured for connecting hollow bodies to one another so that the contents of one the hollow bodies may be transferred to the other hollow body. The invention further relates to manufacturing and operating methods of the valve interconnector, and to an interconnector system using the valve interconnector.

BACKGROUND OF THE INVENTION

Patent document WO2016/138053A1 discloses an interconnector system comprising a valve interconnector and a receiver interconnector, configured to be coupled to a first hollow body (e.g. to a first container) and to a second hollow body (e.g. to a second container) respectively. When the valve interconnector and the receiver interconnector are connected to each other, the interconnector system establishes fluid communication between the hollow bodies, allowing the transfer of part or all of the contents (e.g., chemicals) from one to the other of two hollow bodies.

The valve interconnector of WO2016/138053A1 is configured to be associated to a first hollow body and comprises a neck, a longitudinal passageway being defined through the neck to allow fluid communication between the first hollow body and the second hollow body. Coupling retention flanges integral to the neck provide for a permanent securing of the valve interconnector to the hollow body. A valve assembly is arranged inside the longitudinal passageway through the neck and is configured to assume a closed position and an open position, the fluid communication between the first hollow body and the second hollow body being disabled when the valve assembly is in the closed position and being enabled when the valve assembly is in the open position.

On the other hand, the receiver interconnector of WO2016/138053A1 is configured to be secured to the second hollow body and comprises a housing having an internal volume for receiving the valve interconnector and a hollow post protruding inside the housing and having an internal passageway. A sleeve is arranged inside the housing around the hollow post and is slidable along the hollow post from an uncoupled position, taken when the receiver interconnector is disconnected from the valve interconnector, to a coupled position, taken when the receiver interconnector is connected to the valve interconnector.

The interconnector system of WO2016/138053A1 contemplates several distinct embodiments. With specific reference to the valve interconnector, the embodiment shown in FIG. 4 of WO2016/138053A1 further comprises a base cap having an axially extending base cap interior tube portion extending into the longitudinal passageway through the neck, an axially extending base cap exterior tube portion covering a portion of the exterior surface of the neck and a radially extending base cap head portion connecting the interior tube portion to the exterior tube portion and covering the end of the neck. The inside surface of the interior tube portion of the base cap has an end forming a valve seat configured for ensuring a sealed contact when the valve assembly is in its closed position. The base cap is permanently secured to the neck. In particular, an intermediate tube axially extends from the head portion of the base cap: a press-fit seal between the outer surface of the intermediate tube and the inside surface of the neck prevents leakages.

The valve interconnector shown in FIG. 4 of WO2016/138053A1 further comprises a resilient sealing ring housed inside a sealing ring seat provided in the interior tube portion of the base cap and open at the top. The sealing ring is configured to provide a leak-proof connection with the hollow post of the receiver interconnector by being axially compressed by the hollow post when coupling the receiver interconnector with the valve interconnector.

Due to the axial compression of the sealing ring at the insertion of the hollow post, the valve interconnector shown in FIG. 4 of WO2016/138053A1 exhibits an optimal sealing between the valve interconnector and the receiver interconnector when connected to each other, thereby reliably preventing fluid leakages at the interface between the valve interconnector and the receiver interconnector.

Furthermore, the valve interconnector shown in FIG. 4 of WO2016/138053A1 comprises a coded ring covering the external surface of the base cap. The coded ring is permanently secured to the base cap through a snap coupling. A plurality of radial lugs axially extend from the external surface of the coded ring and are configured to act as keys in mating engagement with corresponding radial channels (acting as keyways) provided in the receiver interconnector. The number and the size of the radial lugs on the coded ring of the valve interconnector constitute a mechanical coding, which univocally identifies the product contained in the first hollow body or intended to be transferred into the first hollow body.

Thus, the coupling between the valve interconnector and the receiver interconnector may be established only in case of matching between the radial lugs provided on the coded ring and the radial channels provided in the receiver interconnector, i.e. only if the mechanical coding of the radial lugs provided on the coded ring and of the radial channels provided in the receiver interconnector identify the same product. It is hence ensured that just the desired product is transferred between the hollow bodies. As a matter of fact, the provision of the coded ring on the valve interconnector shown in FIG. 4 of WO2016/138053A1 plays a prominent role in enhancing reliability and safety in the transfer of products between the hollow bodies. Although the valve interconnector shown in FIG. 4 of WO2016/138053A1 resulted to be extremely effective, the Applicant observed that, when the valve interconnector is coupled to the receiver interconnector, the sealing ring may stick to the receiver interconnector. At the subsequent release of the receiver interconnector, the sealing ring (by adhering to the receiver interconnector) may be dragged away from the sealing ring seat and consequently may be moved out of the valve interconnector. A reduction in the comfort of use of the interconnector system of WO2016/138053A1 may hence be experienced due to the poor positional stability of the sealing ring. Secondly, the Applicant observed that, when the first hollow body has to be recycled following exhaustion of the product contained therein, some impediments arise due to the means adopted for securing of the valve interconnector of WO2016/138053A1 to the first hollow body. In fact, the first hollow body is typically made of plastic material, whilst the valve interconnector is an assembly made partly of plastic materials (that often differ from the plastic material of the first hollow body) and partly of materials other than plastics. For instance, the valve assembly includes a bias spring made of metal. Since the valve assembly, the base cap, the neck and the first hollow body are all permanently secured to each other, disassembling the valve assembly (in particular separating bias spring) from the first hollow body may not be easy and could prejudice the recycling of the first hollow body and of the components of the interconnector system. In addition, the permanent securing e.g. between the neck and the base cap prevents the first hollow body from being rinsed in order to remove residues of product contained in the first hollow body before the recycling.

Aims of the Invention

A first aim of the invention is to improve the above described solutions and specifically to improve the valve interconnector shown in FIG. 4 of WO2016/138053A1, while maintaining all advantageous aspects thereof.

A second aim of the invention is to provide a valve interconnector having improved positional stability for the sealing ring.

A third aim of the invention is to provide a valve interconnector which is able to guarantee the best of comfort of use, in particular in relation to coupling and decoupling operations between the valve interconnector and the receiver interconnector.

A fourth aim of the invention is to provide a valve interconnector which ensures a reliable sealing between all the components of the valve interconnector, both in its uncoupled configuration and in its coupled configuration with the receiver interconnector.

A fifth aim of the invention is to provide a valve interconnector wherein the operation of the valve assembly is improved, with particular regard to the guidance of the bias spring at the coupling between the valve interconnector and the receiver interconnector.

A sixth aim of the invention is to provide a valve interconnector whose manufacturing process is able to lead to a perfect positioning and a perfect securing of all the components of the valve interconnector, in particular of the sealing ring.

A seventh aim of the invention is to provide a valve interconnector facilitating recycling of all the components of the valve interconnector and of the first hollow body.

An eighth aim of the invention is to provide a valve interconnector whose structure prevents the first hollow body from being filled with products different from the intended product, thereby increasing safety of the interconnector system, particularly in view of the fact that the products contained in the first hollow body are usually chemicals.

A ninth aim of the invention is to provide a valve interconnector able to leave permanent evidence of tampering or tampering attempts.

A tenth aim of the invention is to provide a valve interconnector whose facilitating recycling operations without impairing on safety of the interconnector system.

One or more of the above aims are substantially achieved by a valve interconnector, by an interconnector system, by a method of manufacturing a valve interconnector and by a method of operating a valve interconnector in accordance with one or more of the appended claims and/or one or more of the following aspects.

SUMMARY OF THE INVENTION

Aspects of the invention are set out below. The invention includes a plurality of aspects which are independent to each other. Each independent aspect represents per se an invention and does not require the simultaneous implementation of any other independent or dependent aspects below.

A $1^{st}$ aspect concerns a valve interconnector, suitable for use in combination with a receiver interconnector to couple a first hollow body associated to the valve interconnector to a second hollow body associated to the receiver interconnector, comprising: a neck configured to be secured to the first hollow body and a base cap comprising an exterior tube portion covering at least a portion of the external surface of the neck, wherein the exterior tube portion of the base cap and the neck are secured to each other with ability of relative rotation about a central axis, wherein the valve interconnector is provided with a selector operative between the neck and the exterior tube portion of the base cap and configured for assuming at least a first position and a second position.

In a $2^{nd}$ aspect according to the $1^{st}$ aspect, provides that: in the first position the base cap is prevented from being axially released from the neck, in the second position the base cap being enabled to be axially released from the neck.

In a $3^{rd}$ aspect according to any one of the preceding aspects the selector is configured to be toggled from the first position to the second position when the exterior tube portion of the base cap is rotated about the central axis of a predetermined angle.

In a $4^{th}$ aspect according to any one of the preceding aspects the selector includes: a plurality of first ribs radially protruding from the external surface of the neck and a plurality of first interruptions, each first interruption being interposed between any couple of consecutive first ribs.

In a $5^{th}$ aspect according to any one of the preceding aspects the selector further includes: a plurality of second ribs radially protruding from the internal surface of the exterior tube portion of the base cap and a plurality of second interruptions, each second interruption being interposed between any couple of consecutive second ribs, the second ribs being arranged at a lower height than the first ribs.

In a $6^{th}$ aspect according to any one of the preceding two aspects each of the first ribs extends circumferentially for a first angle and each of the second interruptions extends circumferentially for a second angle, the second angle being equal to or greater than the first angle.

In a $7^{th}$ aspect according to any one of the preceding three aspects the first ribs and the second ribs are both equally angularly spaced, an angle separating each couple of consecutive first ribs being substantially equal to an angle separating any couple of consecutive second ribs.

In an $8^{th}$ aspect according to any one of the preceding three aspects it is provided that, in the first position of the selector, the second ribs are at least partially axially aligned with the first ribs, whilst in the second position of the selector the second ribs are wholly axially aligned with the first interruptions.

In a $9^{th}$ aspect according to any one of the preceding aspects the neck includes a flange arranged beneath the base cap and the selector further includes at least a first fin and at least a second fin protruding upwards from the surface of the flange of the neck facing the base cap, the first fin and the second fin being both pliable and being received in a bent condition in respective recesses provided at the bottom of the exterior tube portion of the base cap, the selector being configured so that the toggling of the selector from the first position towards the second position causes the irreversible deformation and the partial severing of one between the first fin and the second fin, the deformation and the partial severing of one between the first fin and the second fin definitively preventing the first position of the selector from being reinstated.

In a 10$^{th}$ aspect according to the preceding aspect the first fin and the second fin are oppositely oriented when in bent condition, so that the toggling of the selector from the first position towards the second position causes the irreversible deformation and the partial severing of the first fin when the exterior tube portion of the base cap is rotated in the anti-clockwise direction, whilst the toggling of the selector from the first position towards the second position causes the irreversible deformation and the partial severing of the second fin when the exterior tube portion of the base cap is rotated in the clockwise direction.

In an 11$^{th}$ aspect according to any one of the preceding two aspects the first fin and the second fin are arranged on diametrically opposite portions of the flange.

In a 12$^{th}$ aspect according to any one of the preceding aspects the selector includes: a first rib radially protruding from the external surface of the neck and a plurality of first mating ribs axially protruding from the external surface of the neck beneath the first rib.

In a 13$^{th}$ aspect according to the preceding aspect the selector includes: a plurality of second ribs radially protruding from the internal surface of the exterior tube portion of the base cap and a plurality of second mating ribs axially protruding from the internal surface of the exterior tube portion of the base cap beneath the second rib, the second mating ribs being arranged at the same height of the first mating ribs.

In a 14$^{th}$ aspect according to the preceding aspect the selector further includes a plurality of weak spots integral to the exterior tube portion of the base cap, at the weak spots the thickness of the exterior tube portion of the base cap being subjected to local abrupt reductions, each one of the weak spots being angularly adjoining to a respective one of the second ribs.

In a 15$^{th}$ aspect according to the preceding aspect the first mating ribs and the weak spots are both equally angularly spaced, an angle separating each couple of consecutive first mating ribs being substantially equal to an angle separating any couple of consecutive weak spots.

In a 16$^{th}$ aspect according to any one of the preceding two aspects it is provided that, in the first position of the selector, the second mating ribs are axially misaligned with the first mating ribs, whilst in the second position of the selector the second mating ribs are at least partly axially aligned with the first mating ribs.

In a 17$^{th}$ aspect according to the preceding aspect the exterior tube portion of the base cap is configured so that the at least partial axial alignment between the first mating ribs and the second mating ribs in the second position of the selector causes an irreversible breakage of the external tube portion of the base cap in correspondence of at least one of the weak spots, the breakage of at least one of the weak spots definitively preventing the first position of the selector from being reinstated.

In an 18$^{th}$ aspect according to any one of the preceding two aspects the first mating ribs and the second mating ribs exhibit respective cam surfaces configured for guiding the second mating ribs towards a complete alignment with the first mating ribs when the angle of rotation of the exterior tube portion of the base cap about the central axis is equal to the predetermined angle.

In a 19$^{th}$ aspect according to aspects 16$^{th}$ and 17$^{th}$ the portions of the exterior tube portion of the base cap angularly past the weak spots exhibit cut edges at their external surface, such cut edges being configured to achieve local smooth reductions in the thickness of the exterior tube portion of the base cap, so that gaps are formed externally to the exterior tube portion of the base cap for allowing the portions of the exterior tube portion of the base cap angularly preceding the weak spots to bend outwards and to facilitate the irreversible breakage of the external tube portion of the base cap at the weak spots.

In a 20$^{th}$ aspect according to any one of the preceding aspects, the valve interconnector further comprises a snap coupling configured to allow the base cap to be axially mounted to the neck in the first position of the selector, the snap coupling being operative between the exterior tube portion of the base cap and the neck.

In a 21$^{st}$ aspect a according to any one of the preceding aspects, the valve interconnector further comprises a positioner configured for enabling the base cap to be mounted to the neck only when the exterior tube portion of the base cap assumes a predetermined relative orientation with respect to the neck.

In a 22$^{nd}$ aspect a according to any one of the preceding aspects, the valve interconnector further comprises a code ring cap secured to the base cap and comprising a tube portion covering at least a portion of the external surface of the exterior tube portion of the base cap.

In a 23$^{rd}$ aspect a according to any one of the preceding two aspects, the valve interconnector further comprises the positioner is operative between the code ring cap and the neck.

In a 24$^{th}$ aspect a according to the preceding aspect, the positioner comprises at least one lip protruding downwards from a bottom surface of the code ring cap and the positioner further comprises at least one positioning slot provided in a flange of the neck arranged beneath the base cap, said at least one lip penetrating into said at least one positioning slot.

In a 25$^{th}$ aspect a according to the preceding aspect, a weakening plane crosses said at least one lip and subdivides a tip portion of the lip from a root portion of the lip and the positioner is configured for causing the tip portion of the lip to be severed or irreversibly deformed when the code ring cap is rotated about the central axis, for providing permanent evidence of toggling of the selector from the first position towards the second position.

In a 26$^{th}$ aspect a according to the preceding aspect, the weakening plane is inclined with respect to the lying plane of the flange of the neck.

In a 27$^{th}$ aspect a according to any one of the preceding three aspects, the positioner comprises a first lip and a second lip protruding downwards from the bottom surface of the code ring cap and the positioner further comprises a first positioning slot and a second positioning slot provided in the flange of the neck, the first lip penetrating into the first positioning slot and the second lip penetrating into the second positioning slot.

In a 28$^{th}$ aspect according to the preceding aspect, the angle spacing the first lip from the second lip in the code ring cap is greater than the angle separating the first position from the second position of the selector.

In a 29th aspect a according to any one of the preceding aspects, the valve interconnector further comprises a passageway defined through the neck to allow fluid communication between the first hollow body and the second hollow body, wherein the base cap further comprises an interior tube portion extending into an end portion of the passageway and a head portion extending from the interior tube portion to the exterior tube portion and wherein a valve assembly is arranged in the passageway and secured to the base cap, the valve assembly being configured to assume at least a closed position and at least an open position, the fluid communication between the first hollow body and the second hollow body being disabled when the valve assembly is in the closed position and being enabled when the valve assembly is in the open position.

In a 30th aspect a according to the preceding aspect, the code ring cap further comprises a head portion covering at least a portion of the external surface of the head portion of the base cap.

In a 31st aspect a according to any one of the preceding two aspects, the valve interconnector further comprises a sealing ring configured to provide a leak-proof connection between the valve interconnector and the receiver interconnector, the sealing ring being housed inside a sealing ring seat at least partially provided in the interior tube portion of the base cap.

In a 32nd aspect a according to any one of the preceding aspects in combination with the 30th aspect, the head portion of the code ring cap comprises a sealing ring enclosing portion configured to cooperate in retaining the sealing ring within the sealing ring seat.

In a 33rd aspect a according to any one of the preceding aspects, the valve interconnector further comprises one or more radial lugs or one or more radial channels axially extend from the external surface of the tube portion of the code ring cap and are configured to act as keys mating engagement with corresponding keyways provided in the receiver interconnector.

In a 34th aspect a according to any one of the preceding aspects, the code ring cap is fixedly secured to the base cap.

In a 35th aspect a according to any one of the preceding aspects, the valve interconnector is provided with a snap fitting configured to allow the code ring cap to be secured to the base cap.

In a 36th aspect according to the preceding aspect, the snap fitting means being operative between the external surface of the exterior tube portion of the base cap and the internal surface of the tube portion of the code ring cap.

In a 37th aspect a according to any one of the preceding two aspects, the snap fitting comprises: at least a rib on one of the external surface of the exterior tube portion of the base cap and the internal surface of the tube portion of the code ring cap and at least a groove, configured to receive said at least one rib, on the other of the external surface of the exterior tube portion of the base cap and the internal surface of the tube portion of the code ring cap.

In a 38th aspect a according to any one of the preceding aspects, the valve assembly comprises a valve head and a valve retainer, the valve retainer being secured to the base cap, a valve stem integral to the valve head being accommodated in a passageway provided in the valve retainer to establish a slidable coupling of the valve head with respect to the valve retainer and then to allow the position of the valve assembly to be changed from a closed position to an open position and viceversa.

In a 39th aspect a according to the preceding aspect, the valve assembly further comprises a bias spring mounted around the valve stem to reinstate the closed position of the valve assembly following expulsion of the receiver interconnector, wherein the bias spring is configured to push the valve head against a valve seat defined at the bottom of the interior tube portion of the base cap.

In a 40th aspect a according to any one of the preceding two aspects, the valve retainer has a portion adjacent to the passageway provided with angularly spaced ribs protruding from its internal surface, wherein radially internal borders of the ribs are configured for guiding one end of the bias spring.

A 41st aspect concerns an assembly comprising a hollow body, a chemical (or other liquid or solid such as powder composition) contained in the hollow body and a valve interconnector according to any one of the preceding claims, wherein the neck of the valve interconnector is secured to the hollow body.

A 42nd aspect concerns an interconnector system comprising a valve interconnector according to any one of aspects from the 1st to 40th and a receiver interconnector, the receiver interconnector being configured to be secured to the second hollow body and comprising:—a housing having an internal volume for receiving the valve interconnector; —a hollow post protruding inside the housing and having an internal passageway, at least an opening being provided in the walls of the hollow post to put the passageway in communication with the exterior and—a sleeve arranged inside the housing around the hollow post and being slidable along the hollow post from an uncoupled position, taken when the receiver interconnector is disconnected from the valve interconnector, to a coupled position, taken when the receiver interconnector is connected to the valve interconnector.

In a 43rd aspect according to the preceding aspect the sleeve comprises at least one lock configured for establishing at least an axial engagement between the receiver interconnector and the valve interconnector when the sleeve is in the coupled position.

In a 44th aspect a according to any one of the preceding two aspects, a plurality of radial keyways axially extend along the internal surface of the housing of the receiver interconnector or along the internal surface of the sleeve of the receiver interconnector for mating engagement with the radial lugs or with the radial channels axially extending along the external surface of the tube portion of the code ring cap of the valve interconnector.

A 45th aspect concerns a method of operating a valve interconnector according to any one of aspects from the 1st to the 40th.

In a 46th aspect according to the preceding aspect the method comprises the steps of: a) toggling the selector from the first position to the second position by rotating the exterior tube portion of the base cap about the central axis of a predetermined angle and b) releasing the base cap from the neck by pulling the base cap along the axial direction.

In a 47th aspect according to the preceding aspect the predetermined angle is between 30° and 120°.

In a 48th aspect according to the preceding aspect the predetermined angle is substantially equal to 45°.

In a 49th aspect according to any one of the preceding three aspects in the first position of the selector first ribs radially protruding from the external surface of the neck are at least partially axially aligned with second ribs radially protruding from the external surface of the neck, whilst in the disengagement position the second ribs are wholly axially aligned with interruptions interposed between the first ribs.

In a 50th aspect according to any one of the preceding four aspects in the first position of the selector first mating ribs axially protruding from the external surface of the neck are axially misaligned with second mating ribs axially protruding from the internal surface of the exterior tube portion of the base cap, whilst in the second position the first mating ribs are at least partially axially aligned with the second mating ribs.

In a 51st aspect according to any one of the preceding five aspects step a) comprises the sub-step of causing an irreversible breakage or an irreversible deformation to at least one element of the neck or to at least one element of the base cap during the toggling of the selector from the first position to the second position, said irreversible breakage or said irreversible deformation to at least one element of the neck or to at least one element of the base cap definitively preventing any subsequent reinstatement of the first position of the selector.

In a 52nd aspect according to any one of the preceding six aspects the selector further includes at least a first fin and at least a second fin protruding from a surface of the neck facing the base cap, the first fin and the second fin being received in a bent condition in respective recesses provided on the base cap, the toggling of the selector from the first position to the second position causing one between the first fin and the second fin to be deformed and partially severed from the neck.

In a 53rd aspect according to any one of the preceding seven aspects the selector further includes a plurality of weak spots integral to the external tube portion of the base cap, at the weak spots the thickness of the exterior tube portion of the base cap being subjected to local abrupt reductions, an at least partial alignment between the first ribs and the second ribs causing the external tube portion of the base cap to be broken at said weak spots.

In a 54th aspect according to any one of the preceding eight aspects the valve interconnector further comprises a code ring cap secured to the base cap and comprising a tube portion covering at least a portion of the external surface of the exterior tube portion of the base cap and wherein step a) comprises the sub-step of causing an irreversible breakage or an irreversible deformation to at least one element of the code ring cap, said irreversible breakage or said irreversible deformation to at least one element of the code ring cap providing permanent evidence of the occurred toggling of the selector from the first position to the second position.

In a 55th aspect according to the preceding aspect the code ring cap comprises at least one lip protruding downwards from a bottom surface of the code ring cap, the toggling of the selector from the first position to the second position causing a tip portion of the lip to be severed or irreversibly deformed.

A 56th aspect concerns a method of manufacturing a valve interconnector according to any one of aspects from the 1st to the 40th, comprising the step of coupling the exterior tube portion of the base cap to the neck, whereby the selector is positioned in the first position with ability of being toggled from the first position to the second position by rotating the exterior tube portion of the base cap about the central axis of a predetermined angle.

In a 57th aspect according to the preceding aspects the method comprises the sub-step of pushing the base cap along the axial direction with second ribs integral to the exterior tube portion of the base cap being at least partially axially aligned with first ribs integral to the neck.

In a 58th aspect according to the preceding aspect the method comprises the further sub-step of bending a first fin and a second fin integral to the neck, whereby the first fin and the second fin are received in a bent condition in respective recesses provided at the bottom of the exterior tube portion of the base cap.

In a 59th aspect according to the preceding aspect the first fin and the second fin are bent with orientation opposite to each other.

In a 60th aspect according to the 56th aspect, comprising the sub-step of pushing the base cap along the axial direction with second mating ribs integral to the exterior tube portion of the base cap being misaligned with first mating ribs integral to the neck.

In a 61st aspect according to the preceding aspect the method further comprises the sub-step of forming gaps externally to the exterior tube portion of the base cap for allowing the portions of the exterior tube portion of the base cap angularly arranged past weak spots of the exterior tube portion of the base cap to bend outwards.

In a 62nd aspect according to any one of aspects from 56th to the preceding aspect the method comprises the sub-step of snap coupling the base cap to the neck.

In a 63rd aspect according to the preceding aspect the method comprises the sub-step of positioning the base cap with a predetermined orientation with respect to the neck.

In a 64th aspect according to the preceding aspect the method comprises the sub-step of inserting at least one lip integral to a code ring cap secured to the base cap into at least one positioning slot obtained in the neck.

In a 65th aspect according to the preceding aspect the method comprises the sub-step of inserting a first lip and a second lip integral to the code ring cap respectively into a first positioning slot and into a second positioning slot obtained in the neck.

A 66th aspect concerns a valve interconnector, suitable for use in combination with a receiver interconnector to couple a first hollow body associated to the valve interconnector to a second hollow body associated to the receiver interconnector, comprising: a neck configured to be secured to the first hollow body, a passageway being defined through the neck to allow fluid communication between the first hollow body and the second hollow body; a base cap secured to the neck and comprising an interior tube portion extending into an end portion of the passageway, an exterior tube portion covering at least a portion of the external surface of the neck and a head portion extending from the interior tube portion to the exterior tube portion; a valve assembly arranged in the passageway and secured to the base cap, the valve assembly being configured to assume at least a closed position and at least an open position, the fluid communication between the first hollow body and the second hollow body being disabled when the valve assembly is in the closed position and being enabled when the valve assembly is in the open position; a sealing ring configured to provide a leak-proof connection between the valve interconnector and the receiver interconnector, the sealing ring being housed inside a sealing ring seat at least partially provided in the interior tube portion of the base cap and a code ring cap secured to the base cap and comprising a tube portion covering at least a portion of the external surface of the exterior tube portion of the base cap and a head portion covering at least a portion of the external surface of the head portion of the base cap.

In a 67th aspect according to the preceding aspect, the head portion of the code ring cap comprises a sealing ring enclosing portion configured to cooperate in retaining the sealing ring within the sealing ring seat.

In a 68$^{th}$ aspect according to any one of the preceding 2 aspects the/a sealing ring enclosing portion protrudes radially inward relative to the interior tube portion of the base cap.

In a 69$^{th}$ aspect according to any one of the preceding 3 aspects the sealing ring enclosing portion extends about an end aperture of the interior tube portion of the base cap forming a continuous retaining lip axially locking the sealing ring.

In a 70$^{th}$ aspect according to any one of the preceding 4 aspects the sealing ring seat and the sealing ring are both axisymmetric, wherein the sealing ring is coaxial to the sealing ring seat.

In a 71$^{st}$ aspect according to any one of the preceding aspects from the 66$^{th}$ to the preceding aspect the sealing ring seat has a bottom side, adjacent to the valve assembly, provided with a bottom abutment surface and on a top side, opposite to the bottom side, provided with a top abutment surface, the bottom abutment surface being formed by the interior tube portion of the base cap and the top abutment surface being formed by the sealing ring enclosing portion of the code ring cap.

In a 72$^{nd}$ aspect according to the preceding aspect the sealing ring comprises a bottom lip and a top lip, positioned at the opposite ends of the sealing ring, the top lip exhibiting an engaging surface matching the top abutment surface of the sealing ring seat.

In a 73$^{rd}$ aspect according to the preceding aspect the top abutment surface of the sealing ring seat and the engaging surface of the top lip of the sealing ring are frustoconical surfaces.

In a 74$^{th}$ aspect according to any one of the preceding three aspect the sealing ring seat comprises a bottom portion internal to the interior tube portion of the base cap and a top portion axially consecutive to said bottom portion and internal to the sealing ring enclosing portion of the code ring cap, the sealing ring seat presenting maximum radial size at an interface between the bottom portion of the sealing ring seat and the top portion of the sealing ring seat.

In a 75$^{th}$ aspect according to the preceding aspect the radial size of the sealing ring seat varies along an axial extension of the sealing ring seat.

In a 76$^{th}$ aspect according to the preceding aspect the radial size variation of the sealing ring seat follows a monotonic increasing function along the bottom portion of the sealing ring seat and follows a monotonic decreasing function along the top portion of the sealing ring seat.

In a 77$^{th}$ aspect according to any one of the preceding aspects from the 66$^{th}$ to the preceding aspect the sealing ring and the sealing ring seat are configured for allowing the sealing ring to be axially compressed by the receiver interconnector during the coupling with the valve interconnector.

In a 78$^{th}$ aspect according to any one of the preceding aspects from the 66$^{th}$ to the preceding aspect the code ring cap is one piece element.

In a 79$^{th}$ aspect according to the preceding aspect the sealing ring enclosing portion of the code ring cap comprises a flange delimiting an aperture provided at the center of the head portion of the code ring cap, the aperture being configured to act as insertion aperture for the receiver interconnector.

In an 80$^{th}$ aspect according to the preceding aspect the flange extends partly in the axial direction to define an upper edge which is raised with respect to the external surface of the head portion of the base cap.

In an 81$^{st}$ aspect according to any one of the preceding three aspects the head portion of the code ring cap covers the entire external surface of the head portion of the base cap.

In an 82$^{nd}$ aspect according to any one of the preceding aspects from 77$^{th}$ to 80$^{th}$ the head portion of the code ring cap comprises a plurality of linking rods connecting the sealing ring enclosing portion of the code ring cap with the tube portion of the code ring cap, the linking rods being substantially equally angularly spaced with each other.

In an 83$^{rd}$ aspect according to any one of the preceding aspects from the 66$^{th}$ to the preceding aspect one or more radial lugs or one or more radial channels axially extend along the external surface of the tube portion of the code ring cap and are configured to act as keys configured for mating engagement with corresponding keyways provided in the receiver interconnector.

In an 84$^{th}$ aspect according to any one of the preceding aspects from the 66$^{th}$ to the preceding aspect the code ring cap is fixedly secured to the base cap.

In an 85$^{th}$ aspect according to any one of the preceding aspects from the 66$^{th}$ to the preceding aspect the valve interconnector is provided with a snap fitting configured to allow the code ring cap to be secured to the base cap, the snap fitting being operative between the external surface of the exterior tube portion of the base cap and the internal surface of the tube portion of the code ring cap.

In an 86$^{th}$ aspect according to the preceding aspect the snap fitting comprises: at least one rib on one of the external surface of the exterior tube portion of the base cap and the internal surface of the tube portion of the code ring cap and at least a groove, configured to receive said at least one rib, on the other of the external surface of the exterior tube portion of the base cap and the internal surface of the tube portion of the code ring cap.

In an 87$^{th}$ aspect according to the preceding aspect the at least one rib is continuous or segmented and extends circumferentially along on one of the external surface of the exterior tube portion of the base cap and the internal surface of the tube portion of the code ring cap.

In an 88$^{th}$ aspect according to any one of the preceding two aspects the base cap comprises an intermediate tube axially protruding from the internal surface of the head portion of the base cap, the intermediate tube of the base cap being configured to press-fit into sealed engagement with the internal surface of the neck.

In an 89$^{th}$ aspect according to any one of the preceding aspects from the 66$^{th}$ to the preceding aspect the valve assembly comprises a valve head and a valve retainer, the valve retainer being secured to the base cap, a valve stein integral to the valve head being accommodated in a passageway provided in the valve retainer, the valve stein being configured to establish a slidable coupling of the valve head with respect to the valve retainer and then to allow the position of the valve assembly to be changed from a closed position to an open position and viceversa.

In a 90$^{th}$ aspect according to any one of the preceding two aspects further comprising a snap coupling configured to allow the valve retainer to be axially mounted to the base cap, the snap coupling comprising a circumferential groove provided in the internal surface of the intermediate tube of the base cap and a circumferential flange protruding outwards from an upper edge of the valve retainer.

In a 91$^{st}$ aspect according to any one of the preceding aspects from the 88$^{th}$ to 89$^{th}$ the valve assembly further comprises a bias spring mounted around the valve stein and configured to reinstate the closed position of the valve assembly following expulsion of the receiver interconnector, wherein the bias spring is configured to push the valve head against a valve seat defined at the bottom of the interior tube portion of the base cap.

In a 92$^{nd}$ aspect according to any one of the preceding three aspects the valve retainer has a portion adjacent to the passageway provided with angularly spaced ribs protruding from its internal surface, wherein radially internal borders of the ribs are configured for guiding one end of the bias spring.

In a 93$^{rd}$ aspect according to any one of the preceding aspects from the 66$^{th}$ to the preceding aspect the exterior tube portion of the base cap and the neck are secured to each other with ability of relative rotation about a central axis and wherein the valve interconnector comprises: a selector operative between the neck and the exterior tube portion of the base cap and configured for assuming at least a first position and a second position, in the first position the base cap being prevented from being axially released from the neck, in the second position the base cap being enabled to be axially released from the neck and wherein the selector is configured for allowing it to be toggled from the first position to the second position when the exterior tube portion of the base cap is rotated about the central axis of a predetermined angle.

In a 94$^{th}$ aspect according to the preceding aspect the selector includes: a plurality of first ribs radially protruding from the external surface of the neck, a plurality of first interruptions, each first interruption being interposed between any couple of consecutive first ribs, a plurality of second ribs radially protruding from the internal surface of the exterior tube portion of the base cap and a plurality of second interruptions, each second interruption being interposed between any couple of consecutive second ribs, the second ribs being arranged at a lower height than the first ribs, wherein in the first position of the selector the second ribs are at least partially axially aligned with the first ribs, whilst in the second position of the selector the second ribs are wholly axially aligned with the first interruptions.

In a 95$^{th}$ aspect according to the preceding aspect the neck includes a flange arranged beneath the base cap and the selector further includes at least a first fin and at least a second fin protruding upwards from the surface of the flange of the neck facing the base cap, the first fin and the second fin being both pliable and being received in a bent condition in respective recesses provided at the bottom of the exterior tube portion of the base cap, the selector being configured so that the toggling of the selector from the first position towards the second position causes the irreversible deformation and the partial severing of one between the first fin and the second fin, the deformation and the partial severing of one between the first fin and the second fin definitively preventing the first position of the selector from being reinstated.

In a 96$^{th}$ aspect according to the 93$^{rd}$ aspect the selector includes: a first rib radially protruding from the external surface of the neck, a plurality of first mating ribs axially protruding from the external surface of the neck beneath the first rib, a plurality of second ribs radially protruding from the internal surface of the exterior tube portion of the base cap, a plurality of second mating ribs axially protruding from the internal surface of the exterior tube portion of the base cap beneath the second rib, the second mating ribs being arranged at the same height of the first mating ribs, a plurality of weak spots integral to the exterior tube portion of the base cap, at the weak spots the thickness of the exterior tube portion of the base cap being subjected to local abrupt reductions, each one of the weak spots being angularly adjoining to a respective one of the second ribs, wherein in the first position of the selector the second mating ribs are axially misaligned with the first mating ribs, whilst in the second position of the selector the second mating ribs are at least partly axially aligned with the first mating ribs.

In a 97$^{th}$ aspect according to the preceding aspect the exterior tube portion of the base cap is configured so that the at least partial axial alignment between the first mating ribs and the second mating ribs in the second position of the selector causes an irreversible breakage of the external tube portion of the base cap in correspondence of at least one of the weak spots, the breakage of the at least one of the weak spots definitively preventing the first position of the selector from being reinstated.

In a 98$^{th}$ aspect according to any one of the preceding five aspects at least one lip protrudes downwards from a bottom surface of the code ring cap and at least one positioning slot is provided in a flange of the neck arranged beneath the base cap, said at least one lip penetrating into said at least one positioning slot.

In a 99$^{th}$ aspect according to the preceding aspect a weakening plane crosses said at least one lip and subdivides a tip portion of the lip from a root portion of the lip and the positioner is configured for causing the tip portion of the lip to be severed or irreversibly deformed when the code ring cap is rotated about the central axis, for providing permanent evidence of the toggling of the selector from the first position towards the second position.

In a 100$^{th}$ aspect according to any one of the preceding two aspects said at least one lip comprises a first lip and a second lip and wherein said at least one positioning slot comprises a first positioning slot and a second positioning slot, the first lip penetrating into the first positioning slot and the second lip penetrating into the second positioning slot of the neck, the angle spacing the first lip from the second lip in the code ring cap being greater than the angle separating the first position from the second position of the selector.

A 101$^{st}$ aspect concerns an assembly comprising a hollow body, a chemical contained in the hollow body and a valve interconnector according to any one of aspects from the 66$^{th}$ to the preceding aspect, wherein the neck of the valve interconnector is secured to the hollow body.

A 102$^{nd}$ aspect concerns an interconnector system comprising a valve interconnector according to any one of aspects from the 66$^{th}$ to the 100$^{th}$ and a receiver interconnector, the receiver interconnector being configured to be secured to the second hollow body and comprising:—a housing having an internal volume for receiving the valve interconnector; —a hollow post protruding inside the housing and having an internal passageway, at least an opening being provided in the walls of the hollow post to put the passageway in communication with the exterior and—a sleeve arranged inside the housing around the hollow post and being slidable along the hollow post from an uncoupled position, taken when the receiver interconnector is disconnected from the valve interconnector, to a coupled position, taken when the receiver interconnector is connected to the valve interconnector.

In a 103$^{rd}$ aspect according to the preceding aspect the sleeve comprises at least one lock configured for establishing at least an axial engagement between the receiver interconnector and the valve interconnector when the sleeve is in the coupled position.

In a 104$^{th}$ aspect according to any one of the preceding two aspects a plurality of radial keyways axially extend along the internal surface of the housing of the receiver interconnector or along the internal surface of the sleeve of the receiver interconnector for mating engagement with the radial lugs or with the radial channels axially extending along the external surface of the tube portion of the code ring cap of the valve interconnector.

A 105th aspect concerns a method of manufacturing a valve interconnector according to any one of aspects from the 66th to the 100th, the method comprising the steps of: i) predisposing the valve assembly; ii) securing the valve assembly to the base cap; iii) arranging the sealing ring in the interior tube portion of the base cap; iv) securing the code ring cap to the base cap so that the sealing ring remains retained in the sealing ring seat and v) securing the base cap to the neck.

In a 106th aspect according to the preceding aspect step i) comprises the sub-step of inserting one end of the bias spring within the valve retainer, the end of the bias spring being guided by radially internal borders of ribs protruding from the internal surface of the valve retainer.

In a 107th aspect according to any one of the preceding two aspects step ii) comprises the sub-step of snap coupling the valve retainer to the base cap so that the valve head remains positioned in the valve seat defined at the bottom of the interior tube portion of the base cap.

In a 108th aspect according to any one of the preceding three aspects step ii) comprises the sub-step of accommodating the circumferential flange of the valve retainer into the circumferential groove of the intermediate tube of the base cap.

In a 109th aspect according to any one of the preceding four aspects step iii) comprises the sub-step of inserting the sealing ring in the interior tube portion of the base cap along an axial direction until the bottom lip of the sealing ring comes into tight contact with a surface of the base cap acting as the bottom abutment surface of the sealing ring seat.

In a 110th aspect according to any one of the preceding five aspects step iv) comprises the sub-step of snap coupling the code ring cap to the base cap by engaging the rib and the groove of the snap fitting.

In a 111th aspect according to any one of the preceding six aspects step iv) comprises the sub-step of delimiting the sealing ring seat on the top side, the sealing ring remaining so interposed between a surface of the base cap acting as the bottom abutment surface of the sealing ring seat and a surface of the code ring cap acting as the top abutment surface of the sealing ring seat.

In a 112th aspect according to any one of the preceding seven aspects step iv) comprises the sub-step of coupling the code ring cap to the base cap so that the sealing ring remains axially locked in the sealing ring seat.

In a 113th aspect according to any one of the preceding eight aspects step v) comprises the sub-step of press-fitting the intermediate tube of the base cap into sealed engagement with the internal surface of the neck.

In a 114th aspect according to any one of the preceding nine aspects step v) comprises the sub-step of coupling the exterior tube portion of the base cap to the neck.

In a 115th aspect according to any one of the preceding ten aspects step v) comprises the sub-step of positioning the selector in the first position with ability of being toggled from the first position to the second position by rotating the exterior tube portion of the base cap about the central axis of a predetermined angle.

BRIEF DESCRIPTION OF THE DRAWINGS

Exemplifying aspects of the invention are described below, with reference to the attached drawings provided for indicative and therefore non-limiting purpose, wherein:

FIG. 1 is a first perspective view of a valve interconnector in accordance with the present invention, in particular as it may result following implementation of the method of manufacturing according to certain aspects of the present invention;

FIG. 2 is a second perspective view of a valve interconnector in accordance with the present invention, in particular as it may result following implementation of the operating method according to aspects of the present invention;

DETAILED DESCRIPTION OF ASPECTS OF THE INVENTION

Valve Interconnector

Figure 3:
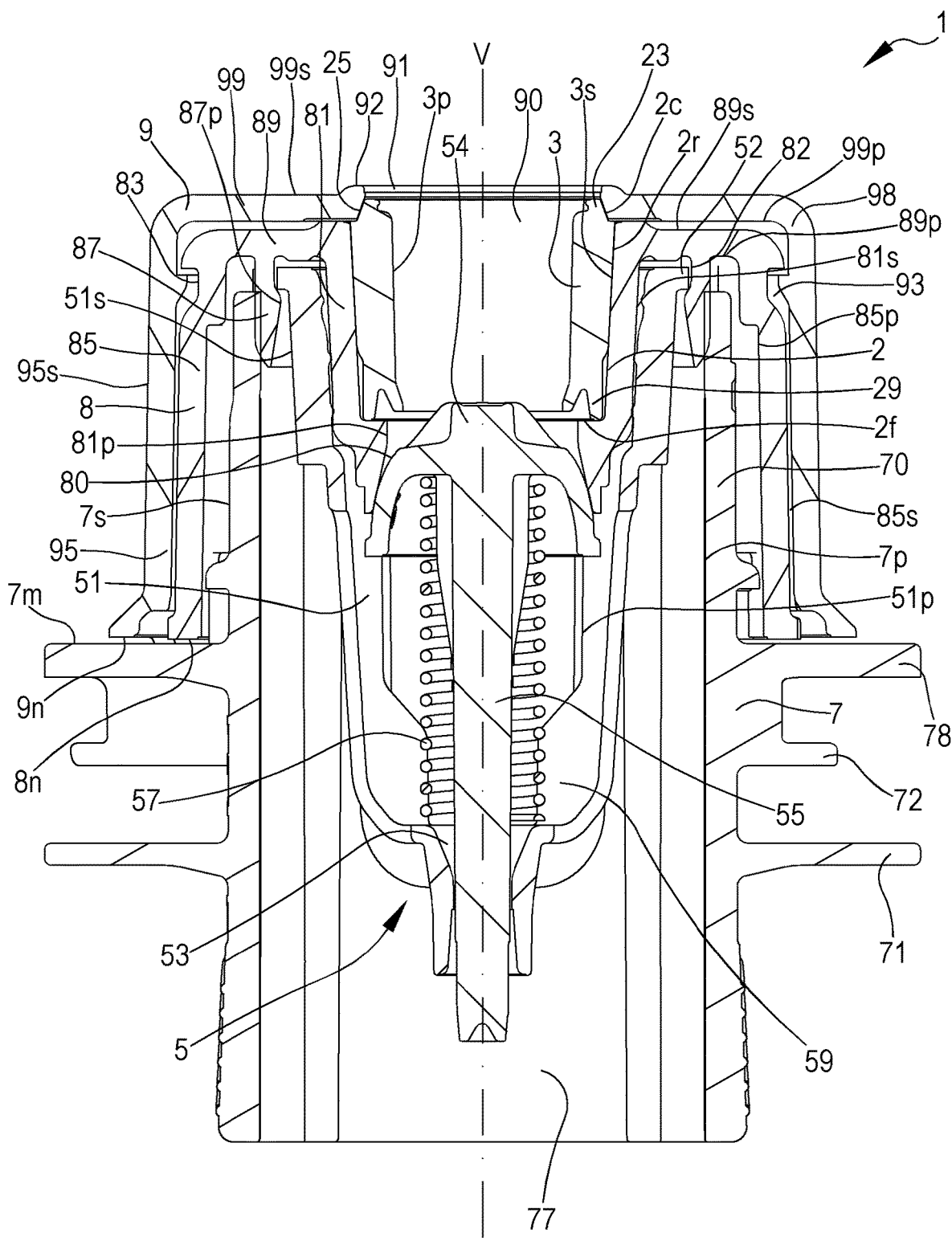
FIG. 3 is a sectional view of a valve interconnector in accordance with aspects of the present invention.

A valve interconnector 1 is shown in FIGS. 1 to 14. A valve interconnector is a coupling device configured to be coupled to a complementary coupling device (receiver interconnector 10 shown in FIG. 15) in order to provide an interconnector system which allows a controlled path for the passage of a liquid (e.g., a chemical) from a first location to a second location. The valve interconnector 1 is hence designed to mate with the receiver interconnector 10 and consequently to create a junction enabling the liquid to pass through the interconnector system. The valve interconnector 1 is also designed to be secured to a first hollow body, such as the hollow body 4 shown in FIG. 14. In particular, the valve interconnector 1 may be secured to a container or to a package having the capacity to hold a liquid or may be secured to a conduit having the capacity of allowing the passage of a liquid. On the other hand, as shown in FIG. 15, the receiver interconnector 10 may be secured to a second hollow body 400, which may be a conduit connected to further convey a liquid to, for example, a dispenser, a diluent, a source of liquid, or a spout associated to a further container.

The valve interconnector 1 comprises a neck 7. The neck 7 may be a one piece element, optionally made of plastic material. In order to ensure a permanent securing to the first hollow body 4, the neck 7 may include a lower coupling retention flange 71 and an upper coupling retention flange 72 which extend radially outward from the neck 7. Because the valve interconnector 1 is designed for the flow of liquid therethrough upon coupling, the neck 7 is of tubular conformation. In particular, a passageway 77 is defined through the neck 7 to allow fluid communication between the first hollow body 4 and the second hollow body 400. The passageway 77 extends longitudinally along a central axis V of the valve interconnector 1 and develops between an internal end portion oriented towards the first hollow body 4 and an external end portion oriented away from the first hollow body 4 (and consequently oriented towards the receiver interconnector 10). The neck 7 extends in the radial direction between an internal surface $7p$ facing the passageway 77 and an external surface $7s$ substantially parallel to the internal surface $7p$. The surfaces $7p$ and $7s$ may be both substantially cylindrical. In particular, surfaces $7p$ and $7s$ may be substantially coaxial and share the same central axis V, as shown in FIG. 2. The external surface $7s$ externally delimits a tubular end portion 70 axially extending beyond the coupling retention flanges 71 and 72.

The valve interconnector 1 further comprises a base cap 8 secured to the neck 7 with ability of a relative rotation around the central axis V. The base cap 8 may be a one piece element, optionally made of plastic material. The base cap 8 is advantageously designed to enclose the tubular end portion 70 of the neck 7. To this purpose, the base cap 8 may comprise an interior tube portion 81 extending into an end portion of the passageway 77 for a predetermined length, an exterior tube portion 85 covering wholly or partially the external surface $7s$ of the neck 7 and a head portion 89 extending from the interior tube portion 81 to the exterior tube portion 85. Advantageously, the head portion 89 develops seamlessly with the interior tube portion 81 and the exterior tube portion 85. The interior tube portion 81, the exterior tube portion 85 and the head portion 89 may all be substantially axisymmetric, the axis of symmetry of the portions 81, 85 and 89 substantially coinciding with the central axis V of the passageway 77. The exterior tube portion 85 may substantially contemplate a cylindrical shape, in particular the respective internal surface $85p$ and external surface $85s$ being both substantially cylindrical and coaxial. The head portion 89 may substantially contemplate a discoidal shape, the internal surface $89p$ covering the tubular end portion 70 of the neck 7 at the top and the external surface $89s$ facing the receiver interconnector 10. The interior tube portion 81 may contemplate a substantially frustoconical shape, in particular the respective internal surface $81p$ and external surface $81s$ being both substantially frustoconical and coaxial. The distance between the external surface $81s$ of the interior tube portion 81 and the internal surface $7p$ of the neck may hence be subject to a slight reduction moving axially along the passageway 77, as clearly shown in particular in FIG. 3.

The securing of the base cap 8 to the neck 7 may involve a snap coupling operative between the exterior tube portion 85 of the base cap 8 and the neck 7 allowing the base cap 8 to be axially mounted to the neck 7. As will be detailed below, the snap coupling advantageously contemplates ribs provided on the external surface $7s$ of the neck 7 and to the internal surface $85p$ of the exterior tube portion 85. Furthermore, the base cap 8 may be provided with elements configured to establish a sealed engagement with the internal surface $7p$ of the neck 7. For instance, the base cap 8 may comprise an intermediate tube 87 which axially protrudes from the internal surface $89p$ of the head portion 89 of the base cap 8 and which is configured to press-fit into sealed engagement with the internal surface $7p$ of the neck 7.

Moreover, the valve interconnector 1 comprises a valve assembly 5 arranged in the passageway 77 and configured to assume at least an open position and a closed position. In the open position of the valve assembly 5 the fluid communication through the passageway 77 is enabled, whilst in the closed position of the valve assembly 5 the fluid communication through the passageway 77 is disabled. The valve interconnector 1 is configured so that the valve assembly 5 assumes its open position when the receiver interconnector 10 is coupled to the valve interconnector 1 to allow the fluid communication between the first hollow body 4 and the second hollow body 400, whilst assumes its closed position in absence of connection between the receiver interconnector 10 and the valve interconnector 1 to prevent losses of the liquid contained in the first hollow body 4 through the passageway 77 and to prevent undue fillings of the first hollow body 4.

More particularly, the valve interconnector 1 is configured so that the valve assembly 5 automatically moves to the open position when an element of the receiver interconnector 10 is inserted into the passageway 77 for a predetermined depth and conversely automatically moves to the closed position when the same element of the receiver interconnector 10 is released from the passageway 77. Typically, such an element of the receiver interconnector 10 is represented by a hollow post 103 having an internal passageway 104 and at least one opening 144 putting the passageway 104 in communication with the exterior.

In order to move from the closed position to the open position and vice versa, the valve assembly 5 comprises mobile elements and fixed elements. The valve assembly 5 may comprise, as mobile element, a valve head 54. In the closed position of the valve assembly 5, the valve head 54 is into sealing contact with a valve seat 80 which is in particular defined at the bottom of the interior tube portion 81 of the base cap 8, whilst, in the open position of the valve assembly 5, the valve head 54 is separate from the valve seat 80. The valve assembly 5 may comprise, as fixed element, a valve retainer 51 secured to the base cap 8. Moreover, since the valve seat 80 is integral to the interior tube portion 81 of the base cap 8, also the base cap 8 can be considered as a fixed element of the base cap 8.

The valve retainer 51 may have a cup-shaped open structure so that liquid passing between the valve seat 80 and the valve head 54 can pass also through the valve retainer 51. Longitudinal slits extending axially and angularly spaced are in particular provided in the bottom portion of the valve retainer 51 for the passage of the liquid through the valve retainer 51. A snap coupling may be provided for allowing the valve retainer 51 to be axially mounted to the base cap 8. In particular, the valve retainer 51 may be provided with a circumferential flange 52 extending from the external surface 51s of the valve retainer 51, optionally protruding radially outwards from an upper edge of the valve retainer 51. Such a circumferential flange 52 is accommodated into a corresponding circumferential groove 82 provided in the internal surface 87p of the intermediate tube 87 of the base cap 8, the engagement so achieved between the valve retainer 51 and the interior tube portion 81 (which is pressed radially inwards by the internal surface 7p of the neck 7) ensuring a stable and secure support of the valve assembly 5.

The relative movements of the valve head 54 with respect to the valve retainer 51 (in particular the movements bringing the valve assembly 5 from the closed position to the open position and vice versa) may be obtained by establishing a slidable coupling of the valve head 54 with respect to the valve retainer 51, in particular such a slidable coupling allowing the valve head 54 to slide substantially along the central axis V. To this purpose, the valve head 54 may be provided with a valve stein 55 accommodated in a passageway 53 provided in the valve retainer 51, the valve stein 55 being optionally made in one piece with the valve head 54.

The valve assembly 5 may further comprise a bias spring 57, the bias spring 57 acting on the valve head 54 by pushing it against the valve seat 80. Therefore, the bias spring 57 contributes to reinstate the closed position of the valve assembly 5 following the release of the receiver interconnector 10. The bias spring 57 may be mounted around the valve stein 55, so that the upper end and the lower end of the bias spring 57 get into contact with the valve head 54 and with the valve retainer 51 respectively.

Advantageously, the valve assembly 5 implements measures for guiding the bias spring 57 towards its correct position inside the valve retainer 51. To this purpose, in fact, the valve retainer 51 is provided with angularly spaced ribs 59 protruding from the internal surface 51p of the valve retainer 51. The ribs 59 are in particular arranged at a bottom portion of the valve retainer 51, i.e. at a portion adjacent to the passageway 53. The ribs 59 may have roughly a trapezoidal shape and may be reasonably limited in length, so as not to cause any interference with the sliding of the valve head 54. The radially internal borders of the ribs 59 may be effectively used for achieving a proper guidance of the lower end of the bias spring 57. In fact, the radially internal borders of the ribs 59 define a cylindrical seat above the passageway 53, with the cylindrical seat accommodating the lower end of the bias spring 57.

The valve interconnector 1 further comprises a code ring cap 9 secured to the base cap 8. The code ring cap 9 may be a one piece element, optionally made of plastic material. The code ring cap 9 may advantageously be designed to enclose the base cap 8, so that at least preponderant portions of the base cap 8 are covered by the code ring cap 9. More in detail, the code ring cap 9 comprises a tube portion 95 covering at least partly the external surface 85s of the exterior tube portion 85 of the base cap 8 and a head portion 99 covering at least partly the external surface 89s of the head portion 89 of the base cap 8. In practice, the code ring cap 9 represents the element of the valve interconnector 1 accessible to the exterior and hence available for operations such as the release operation of the base cap 8 from the neck 7 that will be described below.

The code ring cap 9 is fixedly secured to the base cap 8. To this purpose, the valve interconnector 1 is provided with a snap fitting configured to allow the code ring cap 9 to be secured to the base cap 8. In particular, the snap fitting is configured the code ring cap 9 for being axially mounted on the base cap 8. The snap fitting may be operative between the external surface 85s of the exterior tube portion 85 of the base cap 8 and the internal surface 95p of the tube portion 95 of the code ring cap 9. In particular, the snap fitting comprises at least one rib 93 and at least a groove 83 conjugated in shape, so that the groove 83 is capable to receive the rib 93 for establishing the coupling between the code ring 9 and the base cap 8. The rib 93 and the groove 83 may develop continuously along the whole circumferences of the code ring 9 and of the base cap 8 or otherwise may circumferentially develop only for a predetermined angle. In the latter case (represented in enclosed Figures), the code ring 9 and of the base cap 8 advantageously comprise a plurality of ribs 93 and a plurality of grooves 83 which are equally spaced to each other and which form (if taken together) a segmented rib and a segmented groove developing along the whole circumferences of the code ring 9 and of the base cap 8. The snap fitting of the valve interconnector 1 depicted in the enclosed Figures contemplates the provision of the rib 93 on the internal surface 95p of the tube portion 95 of the code ring cap 9 and the provision of the groove 83 on the external surface 85s of the exterior tube portion 85 of the base cap 8. However, the opposite arrangement (rib provided on the external surface 85s of the exterior tube portion 85 of the base cap 8 and groove provided on the internal surface 95p of the tube portion 95 of the code ring cap 9) may be envisaged as well.

The code ring cap 9 is configured to act as a safety device enabling the transfer of liquid between the hollow bodies through the interconnector system only in case of matching between a mechanical coding associated to the code ring cap 9 (and representative of a predetermined product 40 contained in the first hollow body 4) and a mechanical coding associated to the receiver interconnector 10 (and representative of a predetermined product contained in the second hollow body 400). Consequently, the transfer of liquid between the hollow bodies may be established only if the mechanical coding associated to the code ring cap 9 and the mechanical coding associated to the receiver interconnector 10 identify just the same product 40. It shall be emphasized that the provision of the code ring cap 9 and the association of the mechanical coding to the code ring cap 9 allow standardization of the production of the valve interconnector 1. In fact, depending on the product intended to be contained in the first hollow body 4, a different code ring cap 9 may be mounted in the valve interconnector 1, all other components of the valve interconnector 1 remaining identical for all products.

Advantageously, the mechanical coding associated to the code ring cap 9 includes one or more radial lugs or one or more radial channels 94 axially extending from the external surface 95s of the tube portion 95 of the code ring cap 9. The radial lugs or radial channels 94 are configured to act as keys designed for mating engagement with corresponding keyways 100 provided in the receiver interconnector 10. Furthermore, the axial extension of the radial lugs or radial channels 94 on the external surface 95s of the tube portion 95 of the code ring cap 9 may be exploited for obtaining the alignment of the valve interconnector 1 with the receiver interconnector 10 during coupling.

The tube portion 95 of the code ring cap 9 may be substantially axisymmetric about the central axis V, the surfaces 95*p* and 95*s* being both substantially cylindrical. The head portion 99 of the code ring cap 9 may have a substantially discoidal shape. In particular, the internal surface 99*p* of the head portion 99 of the code ring cap 9 covers the entire external surface 89*s* of the head portion 89 of the base cap 8. Alternatively, the head portion 99 of the code ring cap 9 may have a different geometry (functional in particular to obtain a saving in the material used for manufacturing the code ring cap) which allows some portions of the external surface 89*s* of the head portion 89 of the base cap 8 to remain uncovered. For instance, the code ring cap 9 may comprise a plurality of radial linking rods in particular equally angularly spaced with each other or may comprise a plurality of linking rods arranged following a chessboard pattern.

An aperture 90 is provided at the center of the head portion 99 of the code ring cap 9. Since the aperture 90 is intended to be used as insertion aperture for the receiver interconnector 10, its shape is optionally conjugated with the shape of the receiver interconnector 10. For example, the aperture 90 is circular, the aperture 90 being in particular coaxial to the passageway 77. Advantageously, the diameter of the aperture 90 provided at the center of the code ring cap 9 is less than the diameter of the end aperture of the interior tube portion 81 of the base cap 8, as may be appreciated in FIG. 3.

The aperture 90 may be delimited by a flange 91 forming an internal border of the head portion 99 of the code ring cap 9. The flange 91 may extend partly in the axial direction to define an upper edge which is raised with respect to the external surface 99*s* of the head portion 99 of the code ring cap 9. In other words, the flange 91 may be formed by an internal portion of the head portion 99 of the code ring cap 9 which is inclined towards the top, so that the raised upper edge around the aperture 90 is obtained. The head portion 99 of the code ring cap 9 may radially extend from the flange 91 up to the tube portion 95. A transition portion 98 may be provided at the interface between the portions 95 and 99, such a transition portion being advantageously rounded or beveled to facilitate the coupling between the valve interconnector 1 and the receiver interconnector 10.

The valve interconnector 1 further comprises a sealing ring 3 configured to provide a leak-proof connection between the valve interconnector 1 and the receiver interconnector 10 in the coupled configuration of the interconnector system. The sealing ring 3 may be made of an elastic or resilient material such as rubber. The internal surface 3*p* of the sealing ring 3 is configured to establish a tight contact with the receiver interconnector 10 in the coupled configuration of the interconnector system. In accordance with one possible aspect, the internal surface 3*p* of the sealing ring 3 is frustoconical, the diameter of the sealing ring 3 slightly increasing moving along the central axis V towards the aperture 90. In such a manner, the insertion of the receiver interconnector 10 into the valve interconnector 1 is made more comfortable and possible insertion difficulties due to the size tolerances of the receiver interconnector 10 are avoided. The sealing ring 3 comprises a top lip 23 and a bottom lip 29, which are positioned at the opposite ends of the sealing ring 3, the sealing ring 3 being hence a tubular body extending between the lips 23 and 29. The top lip 23 and the bottom lip 29 may have a different geometry for guaranteeing an adequate adhesion and an adequate tightness at both ends of the sealing ring 3.

The valve interconnector 1 further comprises a sealing ring seat 2 wherein the sealing ring 3 is housed. The sealing ring seat 2 may be substantially axisymmetric and substantially coaxial to the sealing ring 3. The sealing ring seat 2 may have a shape conjugated with the shape of the sealing ring 3, in particular the shape of the side surface 2*r* of the sealing ring seat 2 being conjugated with the shape of the external surface 3*s* of the sealing ring 3. Advantageously, the sealing ring 3 is coupled to the sealing ring seat 2 so that a proper axial compression of the sealing ring 3 during the insertion of the receiver interconnector 10 into the valve interconnector 1 is not prevented. Such an axial compression of the sealing ring 3 (which is effective in the enhancement of the fluid tightness between the valve interconnector 1 and the receiver interconnector 10) may be obtained by allowing the sealing ring 3 to slide up to a certain extent along the side surface 2*r* of the sealing ring seat 2 in the direction of the valve assembly 5.

The sealing ring seat 2 is at least partially provided in the interior tube portion 81 of the base cap 8. In particular, the side surface 2*r* of the sealing ring seat 2 may be at least partially formed by the interior tube portion 81 of the base cap 8, the side surface 2*r* of the sealing ring seat 2 defined by the interior tube portion 81 of the base cap 8 being, for example, advantageously slightly frustoconical for making the positioning of the sealing ring 3 more comfortable. Moreover, the bottom side 2*f* of the sealing ring seat is formed by a bottom abutment surface provided on the interior tube portion 81 of the base cap 8, the bottom abutment surface being in particular a surface of the interior tube portion 81 of the base cap 8 adjacent to the valve seat 80 and substantially orthogonal to a central axis V. The bottom abutment surface of the interior tube portion 81 of the base cap 8 is configured to prevent the sealing ring 3 from moving from the sealing ring seat 2 towards the valve seat 80, so retaining the sealing ring 3 into the sealing ring seat 2 during the insertion of the receiver interconnector 10.

According to an aspect of the invention, the code ring cap 9 is configured for cooperating in retaining the sealing ring 3 within the sealing ring seat 2. Such a cooperation results to be effective especially in preventing the sealing ring 3 from exiting the sealing ring seat 2 when the receiver interconnector 10 is released from the valve interconnector 1. In fact, even when the sealing ring 3 is stick to the receiver interconnector 10, the configuration of the code ring cap 9 is such to create an interference with the sealing ring 3 capable of causing the detachment of the sealing ring 3 from the receiver interconnector 10 and of stopping possible movements of the sealing ring 3 away from the valve interconnector 1. Since the receiver interconnector 10 is released from the valve interconnector 1 along the axial direction, the configuration of the code ring cap 9 is such to especially reduce or prevent movements of the sealing ring 3 along the axial direction.

According to certain aspects of the invention, the head portion 99 of the code ring cap 9 comprises a sealing ring enclosing portion which is configured for axially locking the sealing ring 3 and which delimits at the top the sealing ring seat 2. The sealing ring enclosing portion of the head portion 99 of the code ring cap 9 may comprise the flange 91 delimiting the aperture 90. The sealing ring seat 2 has a top side 2*c*, opposite to the bottom side 2*f*, formed by a top abutment surface provided on the sealing ring enclosing portion of the code ring cap 9.

Without limitation, an example of sealing ring 3 and sealing ring seat 2 according to aspects of the invention is illustrated in FIG. 3. The top lip 23 of the sealing ring 3 is contacting the sealing ring enclosing portion of the head portion 99 of the code ring cap 9. As the top lip 23 of the sealing ring 3 exhibits an engaging surface 25 matching the top abutment surface of the sealing ring seat 2, the sealing ring 3 is kept into the sealing ring seat 2 not only by the interference with the sealing ring enclosing portion of the head portion 99 of the code ring cap 9 that impedes axial movements of the sealing ring out of the sealing ring seat 2, but also by the adhesion of the sealing ring 3 with the sealing ring enclosing portion of the head portion 99 of the code ring cap 9 which facilitates the detachment of the sealing ring 3 from the receiver interconnector 10. In order to obtain a wider contact area between the top abutment surface of the sealing ring seat 2 and the engaging surface 25 of the sealing ring 3, both surfaces are frustoconical, i.e. both surfaces present a predetermined inclination with respect to the central axis V. Depending on the configuration of the sealing ring enclosing portion of the head portion 99 of the code ring cap 9 (e.g. the configuration of FIG. 3 having a frustoconical top abutment surface), the sealing ring seat 2 may comprise a top portion internal to the sealing ring enclosing portion of the code ring cap 9, such a top portion being axially consecutive to a bottom portion of the sealing ring seat 2 which is internal instead to the interior tube portion 81 of the base cap 8. The top portion of the sealing ring seat 2 is optionally much smaller in volume than the bottom portion. The radial size of the sealing ring seat 2 varies along the axial extension of the sealing ring seat 2 (as may be appreciated in FIG. 3), such variation in the size being in particular functional to increase the positional stability of the sealing ring 3 into the sealing ring seat 2 without jeopardizing the ease of mounting of the valve interconnector 1. Optionally, the sealing ring seat 2 presents maximum radial size at the interface between the bottom portion of the sealing ring seat 2 and the top portion of the sealing ring seat 2. More optionally, the radial size variation of the sealing ring seat 2 follows a monotonic increasing function along the bottom portion of the sealing ring seat 2 and follows a monotonic decreasing function along the top portion of the sealing ring seat 2 (moving along the central axis V from the valve seat 80 to the aperture 90).

Having described in detail the example illustrated in FIG. 3, it is reiterated that the invention is not limited in that respect. For instance, the top abutment surface of the sealing ring seat 2 may be annular and orthogonal to the central axis V or frustoconical and inclined towards the valve seat 80 (instead of being frustoconical and inclined away from the valve seat 80). In this case, the sealing ring enclosing portion of the code ring cap 9 delimits the sealing ring seat 2 at the top, but the sealing ring seat 2 comprises no portions internal to the sealing ring enclosing portion of the code ring cap 9. Moreover, the top lip 23 of the sealing ring 3 may be positioned at a certain distance from the top abutment surface of the sealing ring seat 2, instead of contacting the top abutment surface of the sealing ring seat 2.

According to further aspects of the invention, the valve interconnector 1 is provided with a selector operative between the neck 7 and the exterior tube portion 85 of the base cap 8. The selector may assume at least a first position and a second position. In the first position of the selector, the base cap 8 is prevented from being released from the neck 7, in particular from being released along the axial direction. Since in first position of the selector the base cap 8 and all components of the valve interconnector 1 secured to the base cap 8 (in particular the valve assembly 5 and the code ring cap 9) are stably coupled to the neck 7 (and consequently to the first hollow body 4), the first position of the selector is devised for the use of the valve interconnector 1, in particular for the coupling of the valve interconnector 1, the valve interconnector 1 being mounted with the selector being in the first position. In the second position of the selector instead, the base cap 8 is enabled to be released from the neck 7, in particular to be released by pulling the base cap 8 along the axial direction. The second position of the selector is devised for the disposal of the first hollow body 4 and of the valve interconnector 1. In fact, after release of the base cap 8 (and of all components secured to the base cap 8, including non-plastic parts such as the bias spring 57), the first hollow body 4 may recycled together with the neck 7. In fact, the coupling of the neck 7 to the first hollow body 4 does not prejudice recyclability of the first hollow body 4, since the neck 7 and the first hollow body 4 are both made of plastic materials. The release of the base cap 8 allows the first hollow body 4 to be rinsed before the recycling, in order to remove residues of the product 40 contained in the first hollow body 4.

According to certain aspects of the invention, the selector of the valve interconnector 1 is configured to be toggled from the first position to the second position following a rotation of the exterior tube portion 85 of the base cap 8 about the central axis V of a predetermined angle, optionally comprised between 30° and 120° and in particular substantially equal to 45°. Advantageously, the toggling of the selector from the first position to the second position may be obtained regardless of the sense of rotation (clockwise or counter-clockwise) of the exterior tube portion 85 of the base cap 8. Finally, it should be pointed out that the rotation of the exterior tube portion 85 of the base cap 8 causing toggling of the selector from the first position to the second position may be performed by directly operating the base cap 8 or by operating a further element of the valve interconnector 1 secured to the base cap 8, in particular the code ring cap 9.

The valve interconnector 1 may be designed according to a first preferred configuration, wherein the first position is prevented from being reinstated following toggling of the selector from the first position to the second position. The first preferred configuration of the valve interconnector 1 is particularly effective in term of safety of the interconnector system. Indeed, should the first hollow body 4 be filled subsequently to the release of the base cap 8, for example with a new product different from the product 40 previously contained in the first hollow body 4, the use state of the valve interconnector 1 (required in particular for coupling the valve interconnector 1 to the receiver interconnector 10, and hence the first hollow body 4 to the second hollow body 400) cannot be recovered anyway.

Advantageously, the first preferred configuration of the valve interconnector 1 involves an irreversible breakage or an irreversible deformation to at least one element of the valve interconnector 1 during toggling of the selector from the first position to the second position. The element of the valve interconnector 1 designed to be irreversibly broken or deformed during toggling of the selector from the first position to the second position may be an element of the neck 7, such as a fin protruding from an exposed surface 7*m* of the neck 7 facing the base cap 8. Alternatively or in addition, the element of the valve interconnector 1 designed to be irreversibly broken or deformed during the toggling of the selector from the first position to the second position may be an element of the base cap 8, such as a weak spot being in particular integral to the external tube portion 85 of the base cap 8.

The valve interconnector 1 may be designed according to a second preferred configuration, wherein permanent evidence is given to a rotation of the exterior tube portion 85 of the base cap 8 about the central axis V starting from the first position of the selector, in particular of a rotation intended to toggle the position of the selector from the first position to the second position. The second preferred configuration of the valve interconnector 1 is also effective in term of increased safety of the interconnector system. Indeed, if the valve interconnector 1 is subject to tampering (e.g., the release of the base cap 8 for substituting the product 40 contained in the first hollow body 4 with a different product) or even only to a tampering attempt, the tampering event or tampering attempt leaves an irreversible and perceptible mark (e.g., a visually and/or tactfully perceptible mark) on the valve interconnector 1.

Advantageously, the second preferred configuration of the valve interconnector 1 involves the provision, in the valve interconnector 1, of a positioner configured for enabling the base cap 8 to be mounted to the neck 7 only when the exterior tube portion 85 of the base cap 8 assumes a predetermined relative orientation with respect to the neck 7. The positioner may be operative between the code ring cap 9 and the neck 7.

The positioner of the valve interconnector 1 may comprise a first lip 12 protruding downwards from a bottom surface 9*n* of the code ring cap 9: the bottom surface 9*n* may in particular be substantially orthogonal to the central axis V and the first lip 12 protruding substantially orthogonal to such a bottom surface 9*n*. Moreover, the positioner of the valve interconnector 1 may comprise a first positioning slot 15 provided in a flange 78 of the neck 7 arranged beneath the base cap 8. The flange 78 (which is arranged beneath the code ring cap 9 as well and which optionally extends substantially orthogonal to the central axis V) may be a flange integral to the neck 7 and arranged above the upper coupling retention flange 72 or may coincide wholly or partially with the upper coupling retention flange 72. The first lip 12 is configured for penetrating into the first positioning slot 15.

A weakening plane may cross the first lip 12, so that the first lip 12 may be subdivided into a tip portion 12*y* and a root portion 12*x* separated from each other by the weakening plane. The positioner may be configured for causing the tip portion 12*y* of the first lip 12 to be severed when the code ring cap 9 is rotated about the central axis V. Alternatively, the positioner may be configured for causing the first lip 12 to be irreversibly deformed at an interface between the tip portion 12*y* and the root portion 12*x* when the code ring cap 9 is rotated about the central axis V. In such a way, since the base cap 8 is secured to the code ring cap 9 and hence rotates about the central axis V as well, permanent evidence of toggling of the selector from the first position towards the second position is given. Advantageously, the weakening plane is inclined with respect to the lying plane of the flange 78 of the neck 7 (which is substantially orthogonal to the central axis V), so that after the severing of the tip portion 12*y*, the root portion 12*x* exhibits a cut edge 12*w* which is inclined with respect to the flange 78.

Optionally, the positioner further comprises a second lip 18 and a second positioning slot 20 having the same configuration of the first lip 12 and of the first positioning slot 15, so that in particular the second lip 18 is configured for penetrating into the second positioning slot 20. The angle spacing the first lip 12 from the second lip 18 is substantially equal to the angle spacing the first positioning slot 15 from the second positioning slot 20 and may be greater than the angle separating the first position from the second position of the selector.

Operation of the positioner of the valve interconnector 1 is depicted in FIG. 1, representing the configuration of the positioner when the valve interconnector 1 is completely assembled, with the selector being in the first position, and in FIG. 2, representing the configuration of the positioner after a tampering attempt made by rotating the code ring cap 9 about the neck 7, with the purpose of toggling the position of the selector from the first position towards the second position. From a comparison between FIGS. 1 and 2, it can be inferred that rotation of the code ring cap 9 about central axis V causes exiting of the lips 12 and 18 from the positioning slots 15 and 20 and severing of the lips 12 and 18 at the interfaces between the tip portions 12*y* and 18*y* and the root portions 12*x* and 18*x*, with the detachment of the tip portions 12*y* and 18*y*. The attempt of tampering remains hence perceptible, since, as shown in FIG. 2, the code ring cap 9 exhibits root portions 12*x* and 18*x* interrupted by cut edges 12*w* and 18*w* in place of intact lips 12 and 18.

The valve interconnector 1 may be designed according to a third preferred configuration. The third preferred configuration combines above first preferred configuration and above second preferred configuration described above. Therefore, the third preferred configuration of the valve interconnector 1 conjugates the prevention of the reinstatement of the first position of the selector following toggling of the selector from the first position to the second position with the permanent evidence provided in case of toggling of the position of the selector from the first position towards the second position. As the first preferred configuration of the valve interconnector 1 and the second preferred configuration of the valve interconnector 1 have both the technical effect of an increased safety of the interconnector system, it should be easily understood that the third configuration of the valve interconnector is even more effective in increasing safety of the interconnector system.

Figure 4:
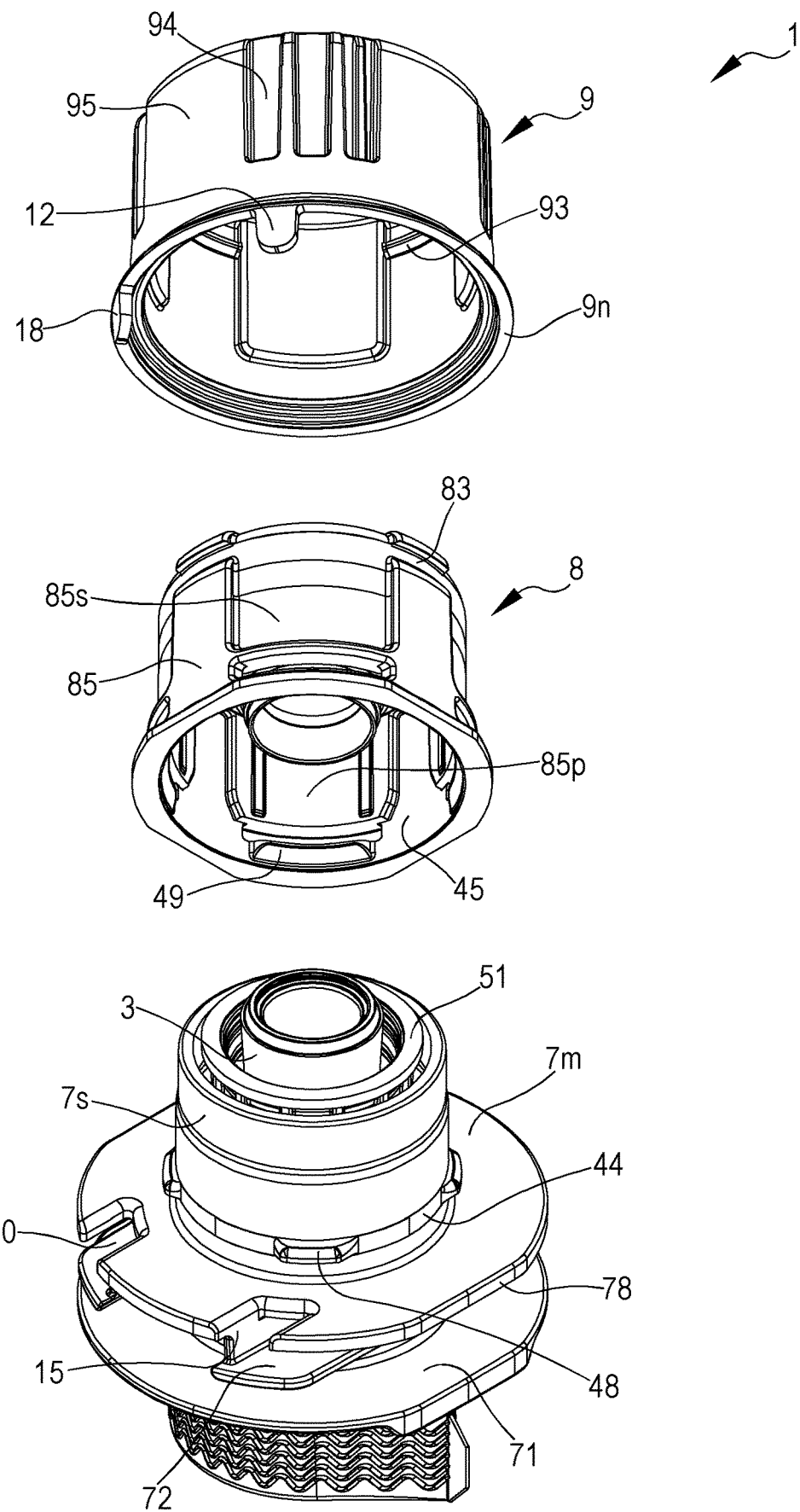
FIG. 4 is an exploded view of a valve interconnector in accordance with a first embodiment of the present invention.
Figure 5:
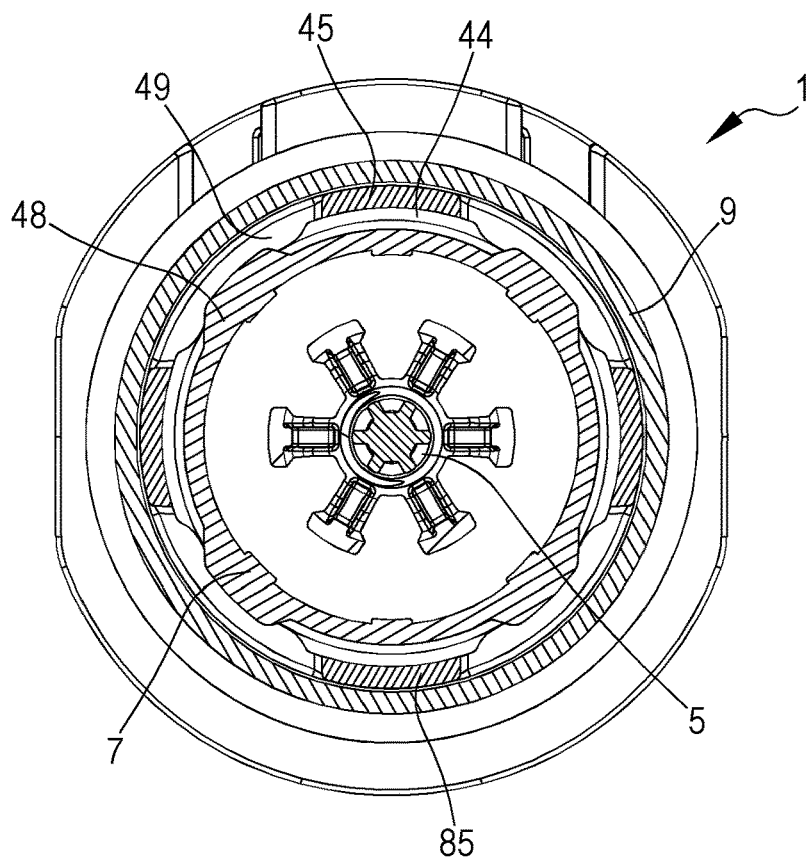
FIG. 5 is a first sectional view of a valve interconnector in accordance with the first embodiment of the present invention, in particular as it may result following implementation of the method of manufacturing according to aspects of the present invention.
Figure 6:
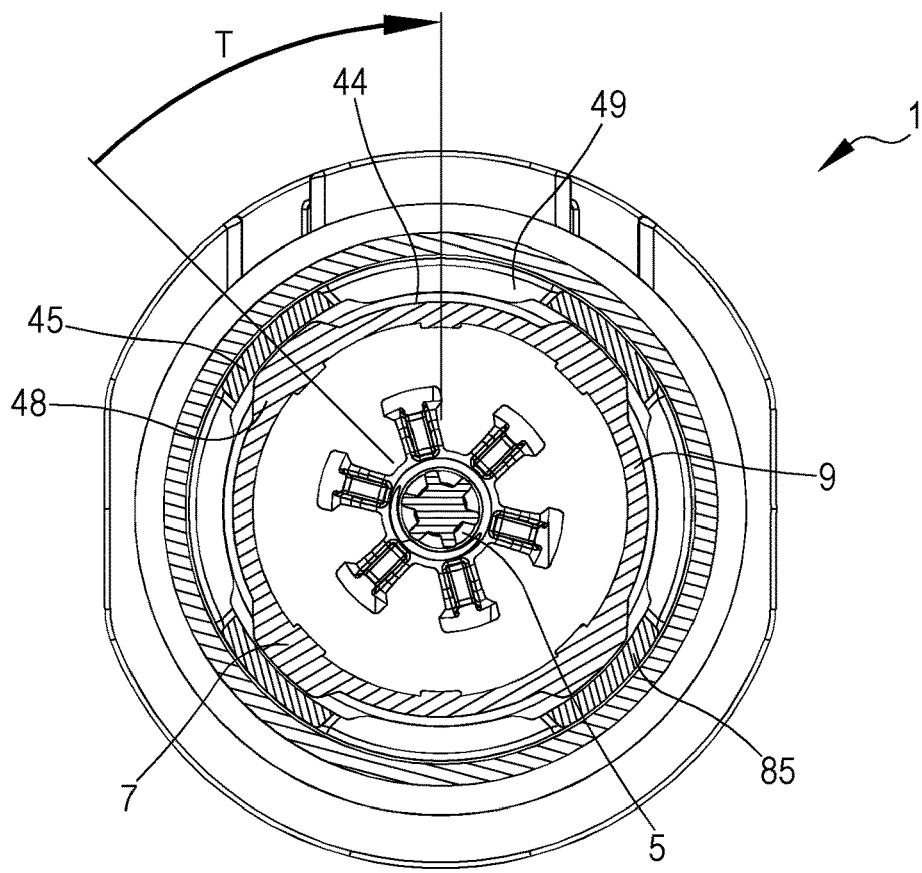
FIG. 6 is a second sectional view of a valve interconnector in accordance with the first embodiment of the present invention, in particular as it may result following implementation of the operating method according to aspects the present invention.

FIGS. 4 to 6 show the valve interconnector 1 in accordance to a first embodiment of the present invention. In particular, FIG. 4 is an exploded view wherein the base cap 8 and the code ring cap 9 have been separated from the remaining components of the valve interconnector 1, whilst FIGS. 5 and 6 are sectional views obtained by sectioning the valve interconnector 1 with a plane orthogonal to the central axis V.

According to the first embodiment of the invention, the selector of the valve interconnector 1 includes a plurality of first ribs 48 radially protruding from the external surface 7*s* of the neck 7. The first ribs 48 may be in one piece with the neck 7. The first ribs 48 may be substantially equal to each other in shape and in size. First interruptions 44 are interposed between any couple of consecutive first ribs 48. Each of the first ribs 48 extends circumferentially for a predetermined angle. The first ribs 48 are optionally positioned substantially at the same height and optionally substantially equally angularly spaced from each other. FIGS. 4 to 6 show in particular that the first ribs 48 radially protruding from the external surface 7*s* of the neck 7 are in number of four and that the separation angle between each couple of consecutive first ribs 48 is equal to 90°. However, it should be remarked that the first embodiment of the invention is not limited in that respect since the number of first ribs 48 may be different from four and consequently the separation angle may be different from 90°.

According to the first embodiment of the invention, the selector of the valve interconnector 1 includes as well a plurality of second ribs 49 radially protruding from the internal surface 85p of the exterior tube portion 85 of the base cap 8, the number of second ribs 49 being equal to the number of first ribs 48. The second ribs 49 may be in one piece with the base cap 8. The second ribs 49 may be substantially equal to each other in shape and in size. Second interruptions 45 are interposed between any couple of consecutive second ribs 49. Each of the second ribs 49 extends circumferentially for a predetermined angle. The angle of extension of the second ribs 49 along the internal surface 85p of the exterior tube portion 85 of the base cap 8 may be equal to the angle of extension of the first ribs 48 along the external surface 7s of the neck 7. Alternatively, the angle of extension of the second ribs 49 along the internal surface 85p of the exterior tube portion 85 of the base cap 8 may be different from the angle of extension of the first ribs 48 along the external surface 7s of the neck 7. In particular, the angle of extension of the second ribs 49 along the internal surface 85p of the exterior tube portion 85 of the base cap 8 may be greater than the angle of extension of the first ribs 48 along the external surface 7s of the neck 7, so that the second ribs 49 are longer than the first ribs 48. The second ribs 49 are optionally positioned substantially at the same height and optionally substantially equally angularly spaced from each other. The second ribs 49 are positioned at a height lower than the height of the first ribs 48, the height of the ribs 48 and 49 being measured from an exposed surface 7m of the neck 7 facing the base cap 8, the exposed surface 7m being in particular a surface of a flange 78 of the neck 7. The second ribs 49 are optionally substantially equally angularly spaced from each other. The separation angle between each couple of consecutive second ribs 49 on the internal surface 85p of the exterior tube portion 85 of the base cap 8 is equal to the separation angle between each couple of consecutive first ribs 48 on the external surface 7s of the neck 7. FIGS. 4 to 6 show in particular that (in accordance to the number and to the distribution of the first ribs 48) the second ribs 49 radially protruding from the internal surface 85p of the exterior tube portion 85 of the base cap 8 are in number of four and that the separation angle between each couple of consecutive second ribs 49 is equal to 90°. However, it should be remarked that the first embodiment of the invention is not limited in that respect since the number of second ribs 49 may be different from four and consequently the separation angle may be different from 90°.

FIG. 5 shows the valve interconnector 1 in accordance to the first embodiment of the invention when the selector is in the first position, whilst FIG. 6 shows the valve interconnector 1 in accordance to the first embodiment of the invention when the selector is in the second position. From a comparison between FIGS. 5 and 6, it may be appreciated that in the first position of the selector the second ribs 49 are axially aligned with the first ribs 48, whilst in the second position of the selector the second ribs 49 are axially aligned with the first interruptions 44. In the first position of the selector, the axial constraint between the ribs 48 and 49 prevents the base cap 8 from being axially released from the neck 7. In the second position of the selector, the base cap 8 is released from the axial interference between the ribs 48 and 49 since the first ribs 48 are axially misaligned with the second ribs 49 and the base cap 8 is free to be axially released from the neck 7.

Since the exterior tube portion 85 of the base cap 8 and the neck 7 are secured to each other with ability of relative rotation about the central axis V, the passage from the condition of axial alignment between the second ribs 49 and the first ribs 48 to the condition of axial alignment between the second ribs 49 and the first interruptions 44 (corresponding to the toggling of the selector of the valve interconnector 1 from the first position to the second position) is obtained by rotating the exterior tube portion 85 of the base cap 8 with respect to the neck 7 (in the clockwise direction or in the counter-clockwise direction) up to reach the toggling angle T which is represented in FIG. 6. The toggling angle T is in particular equal to half the separation angle between each couple of consecutive first ribs 48. In the example of FIGS. 4 to 6, since the separation angle between each couple of consecutive first ribs 48 is equal to 90°, the toggling angle T is equal to 45°. From the comparison between FIGS. 5 and 6, it may be appreciated in essence that in the first embodiment of the invention a sort of bayonet fitting is implemented for toggling the position of the selector of the valve interconnector 1 from the first position to the second position.

Figure 7:
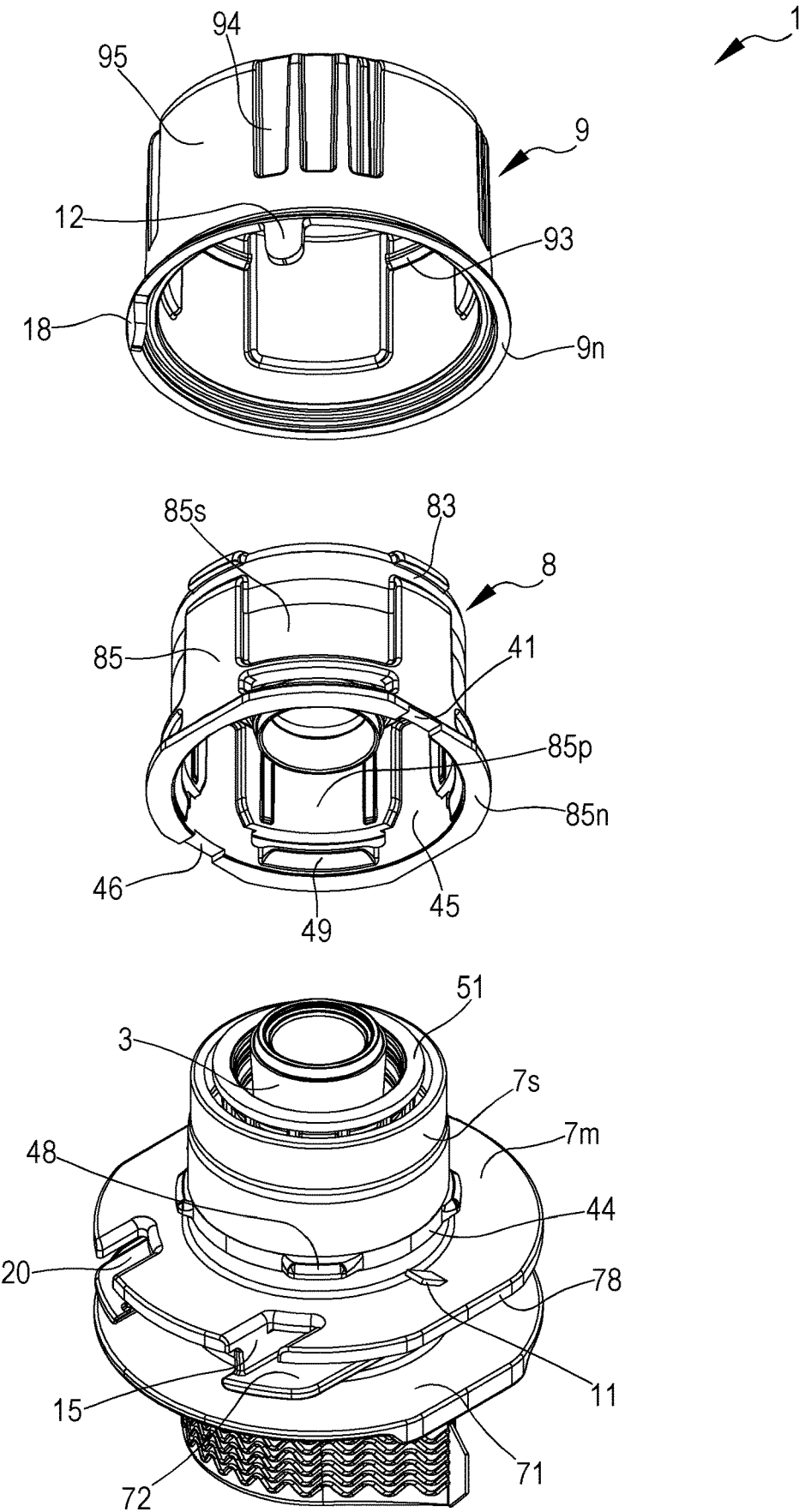
FIG. 7 is an exploded view of a valve interconnector in accordance with a second embodiment of the present invention.
Figure 8:
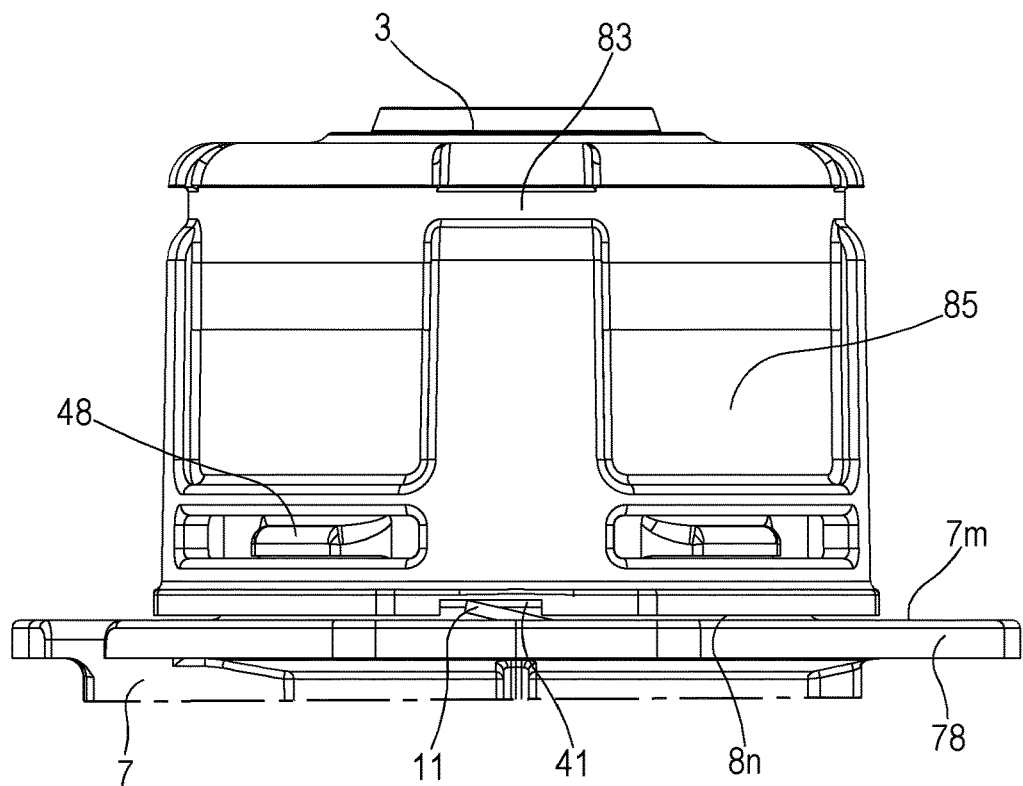
FIG. 8 is a first perspective view of a valve interconnector in accordance with the second embodiment of the present invention, in particular as it may result following implementation of the method of manufacturing according to aspects of the present invention.
Figure 9:
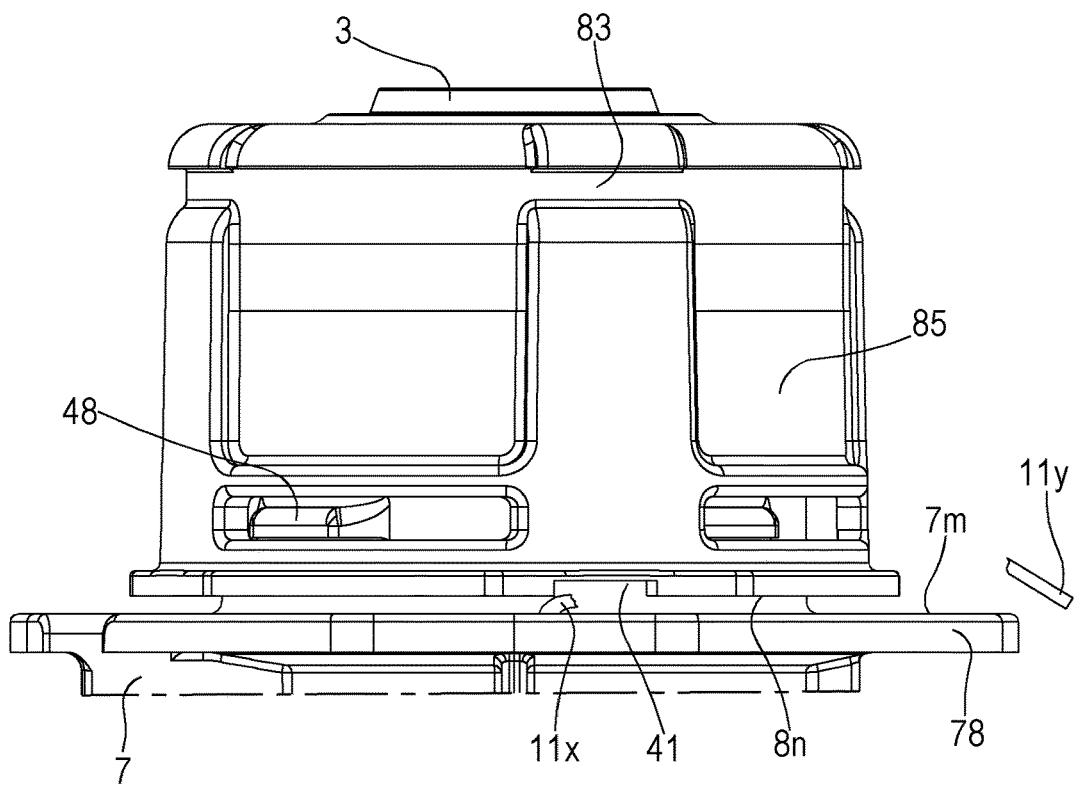
FIG. 9 is a second perspective view of a valve interconnector in accordance with the second embodiment of the present invention, in particular as it may result following implementation of the operating method according to aspects of the present invention.
Figure 10:
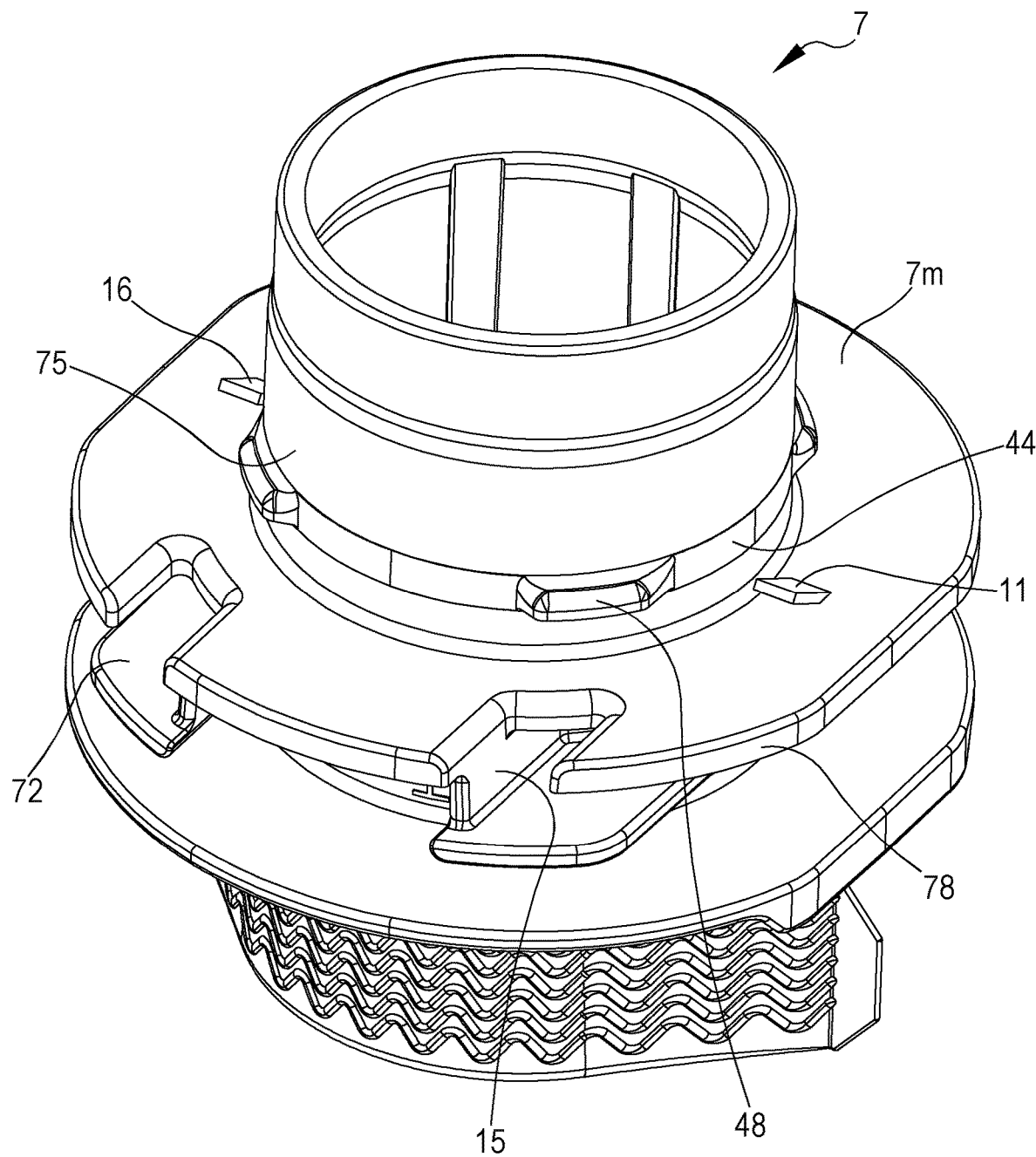
FIG. 10 is a perspective view of an element of a valve interconnector in accordance with the second embodiment of the present invention.

FIGS. 7 to 10 show the valve interconnector 1 in accordance to a second embodiment of the present invention. In particular, FIG. 7 is an exploded view wherein the base cap 8 and the code ring cap 9 have been separated from the remaining components of the valve interconnector 1, whilst FIGS. 8 and 9 are front views wherein the code ring cap 9 has been removed to gain visibility of internal elements of the valve interconnector 1. Finally, FIG. 10 is a perspective view of the neck 7 only.

The second embodiment of the invention includes all of the features of the first embodiment of the invention described above. In addition, the second embodiment of the invention implements the prevention of the reinstatement of the first position following the toggling of the selector from the first position to the second position.

The selector of the valve interconnector 1 further includes a first fin 11 and a second fin 16 protruding upwards from the exposed surface 7m of a flange 78 of the neck 7 facing a bottom surface 8n of the base cap 8. The first fin 11 and the second fin 16 are angularly spaced from each other. The separation angle between the first fin 11 and the second fin 16 may be substantially equal to 180°. In other words, the fins 11 and 16 may be arranged on diametrically opposite portions of the flange 78 of the neck 7, as shown in FIG. 10. The fins 11 and 16 are both pliable elements and are optionally in one piece with the neck 7.

The selector of the valve interconnector 1 includes as well a first recess 41 and a second recess 46 of the exterior tube portion 85 of the base cap 8, the first recess 41 and the second recess 46 being provided in the bottom surface 8n of the base cap 8. The depth of the recesses 41 and 46 is significantly less than the height of the fins 11 and 16. The first recess 41 and the second recess 46 are configured for receiving the first fin 11 and the second fin 16 respectively. In fact, when the base cap 8 is axially mounted to the neck 7, the fins 11 and 16 (molded upwards on the flange 78) bend down to adapt their shape to the shape of the recesses 41 and 46. The fins 11 and 16 are hence received in the recesses 41 and 46 in a bent condition. In particular, the first fin 11 and the second fin 16 bend down in opposite directions. For instance, the first fin 11 rotates in the anti-clockwise direction for assuming its bent condition and being received in the first recess 41 (as shown in FIG. 8), whilst the second fin 16 rotates in the clockwise direction for assuming its bent condition and being received in the second recess 46.

The selector of the valve interconnector 1 is configured so that the toggling of the selector from the first position towards the second position causes the severing of one between the first fin 11 and the second fin 16 in such a manner that the reinstatement of the first position of the selector is definitively prevented. Since the first fin 11 and the second fin 16 are received in the first recess 41 and in the second recess 46 with opposite orientations, the toggling of the selector from the first position towards the second position causes the severing of the first fin 11 when the exterior tube portion 85 of the base cap 8 is rotated in the anti-clockwise direction (as shown in FIG. 9), whilst the toggling of the selector from the first position to the second position causes the severing of the second fin 16 when the exterior tube portion 85 of the base cap 8 is rotated in the clockwise direction.

FIG. 8 shows the valve interconnector 1 in accordance to the second embodiment of the invention when the selector is in the first position, whilst FIG. 9 shows the valve interconnector 1 in accordance to the second embodiment of the invention when the position of the selector is toggled from the first position towards the second position by means of a rotation of the exterior tube portion 85 of the base cap 8 about the central axis V in the anti-clockwise direction. As shown in FIG. 8, in the first position of the selector, the first fin 11 is received in the bent condition in the first recess 41. From a comparison between FIGS. 8 and 9, it may be appreciated that the rotation of the exterior tube portion 85 of the base cap 8 causes an irreversible deformation of the first fin 11 which bends backwards to the point of provoking the detachment of the tip portion 11y of the first fin 11. As a result of the irreversible deformation, the root portion 11x which remains attached to the flange 78 can no longer be received in the first recess 41, so that the first position of the selector of the valve interconnector 1 can no longer be reinstated.

Figure 11:
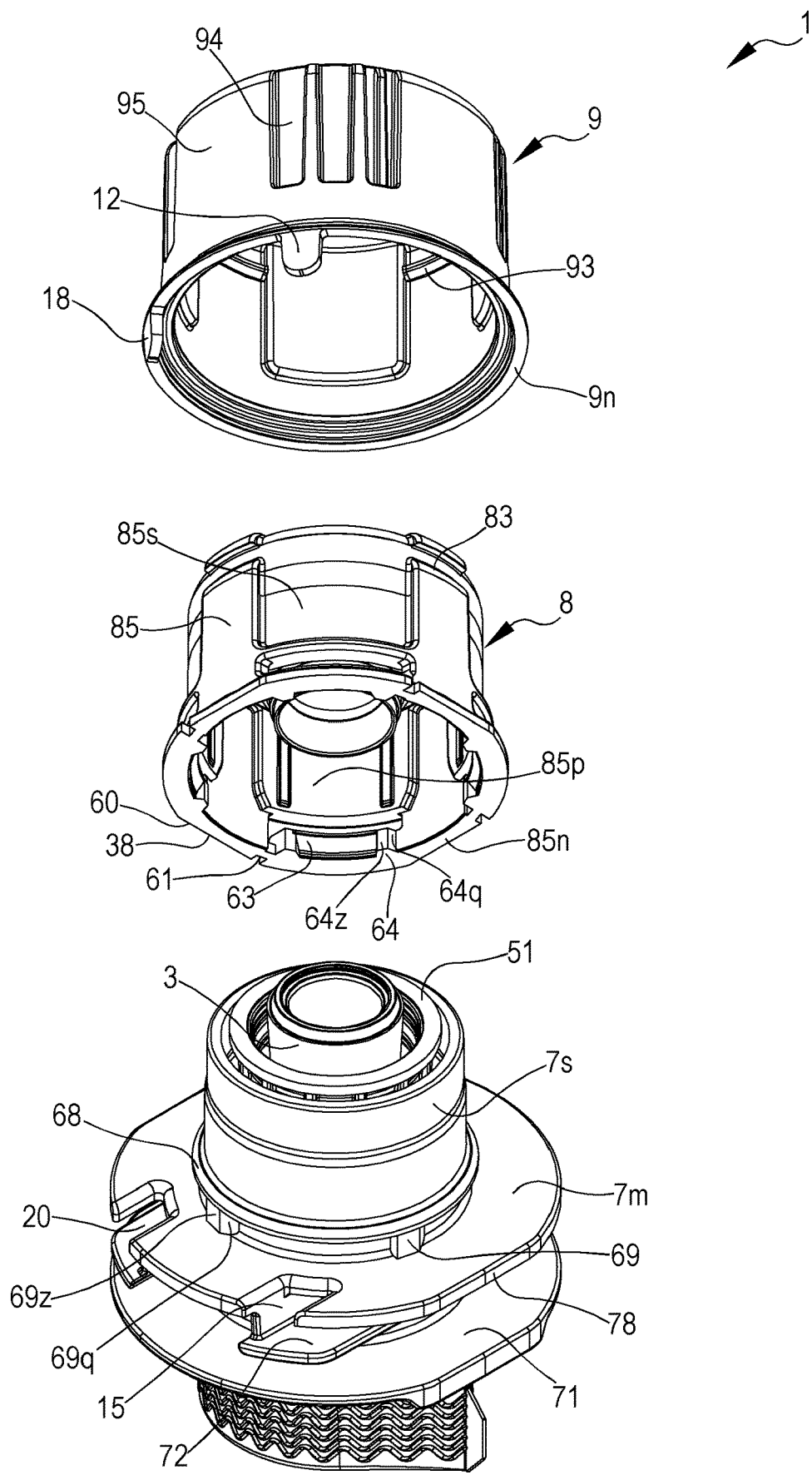
FIG. 11 is an exploded view of a valve interconnector in accordance with a third embodiment of the present invention.
Figure 12:
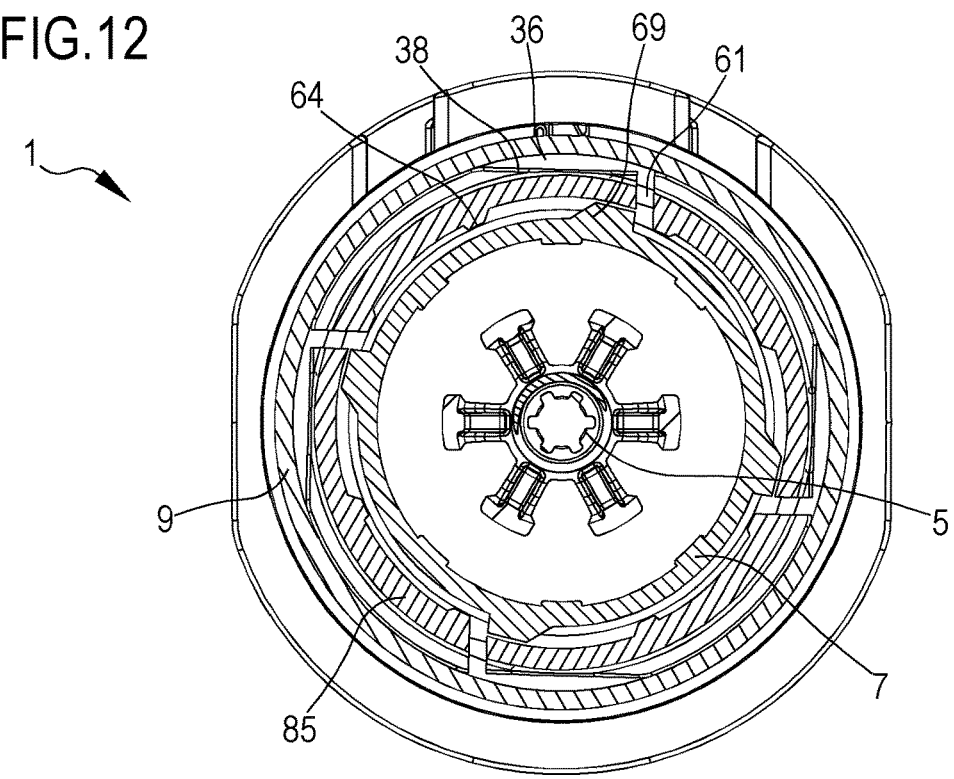
FIG. 12 is a sectional view of a valve interconnector in accordance with the third embodiment of the present invention, in particular as it may result following the implementation of the method of manufacturing according to aspects of the present invention.
Figure 13:
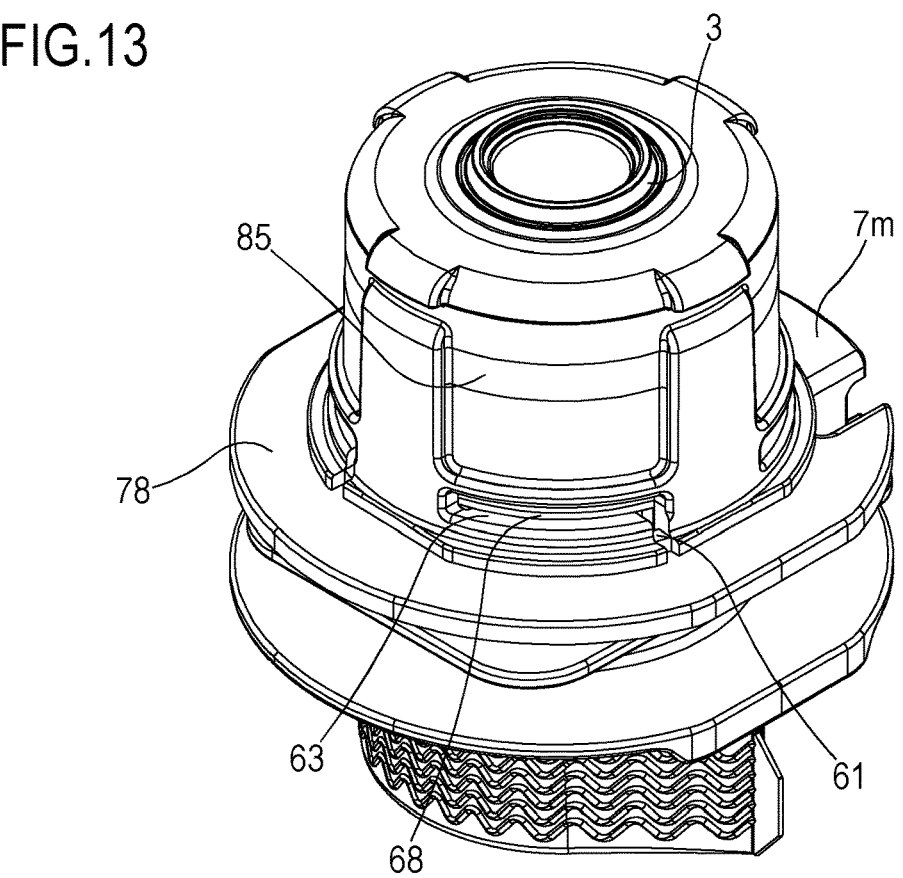
FIG. 13 is a perspective view of a valve interconnector in accordance with the third embodiment of the present invention, in particular as it may result following the implementation of the method of manufacturing according to the present invention.

FIGS. 11 to 13 show the valve interconnector 1 in accordance to a third embodiment of the present invention. In particular, FIG. 11 is an exploded view wherein the base cap 8 and the code ring cap 9 have been separated from the remaining components of the valve interconnector 1, whilst FIGS. 12 and 13 are sectional views obtained by sectioning the valve interconnector 1 with a plane orthogonal to the central axis V.

According to the third embodiment of the invention, the selector of the valve interconnector 1 includes a first rib 68 radially protruding from the external surface 7s of the neck 7 and a plurality of first mating ribs 69 axially protruding from the external surface 7s of the neck 7 beneath the first rib 68. The first rib 68 and the first mating ribs 69 may be in one piece with the neck 7. The first mating ribs 69 may continuously extend substantially parallel to the central axis V from a flange 78 of the neck 7 to the first rib 68. Alternatively, axial interruptions may separate the first mating ribs 69 from the flange 78 or from the first rib 68. The first mating ribs 69 may be equally angularly spaced from each other. The first mating ribs 69 may be substantially equal to each other in shape and in size. Each one of the first mating ribs 69 includes a radially external border 69z which may be angularly preceded by a cam surface 69q providing a smooth transition from the external surface 7s of the neck 7 to the radial external border 69z. FIGS. 11 to 13 show in particular that the first mating ribs 69 axially protruding from the external surface 7s of the neck 7 are in number of four and that the separation angle between each couple of consecutive first mating ribs 69 is equal to 90°. However, it should be remarked that the third embodiment of the invention is not limited in that respect since the number of first mating ribs 69 may be different from four and consequently the separation angle may be different from 90°.

According to the third embodiment of the invention, the selector of the valve interconnector 1 also includes a plurality of second ribs 63 radially protruding from the internal surface 85p of the exterior tube portion 85 of the base cap 8. The second ribs 63 may be in one piece with the base cap 8. The second ribs 63 may be substantially equal to each other in shape and in size. Each of the second ribs 63 extends circumferentially for a predetermined angle. The second ribs 63 are optionally substantially equally angularly spaced from each other. The second ribs 63 are optionally positioned substantially at the same height. The second ribs 63 are positioned at a height lower than the height of the first rib 68, the height of the ribs 63 and 68 being measured from an exposed surface 7m of the neck 7 facing the base cap 8, the exposed surface 7m being in particular a surface of a flange 78 of the neck 7. FIGS. 11 to 13 show in particular that the second ribs 63 radially protruding from the internal surface 85p of the exterior tube portion 85 of the base cap 8 are in number of four and that the separation angle between each couple of consecutive second ribs 63 is equal to 90°. However, it should be remarked that the third embodiment of the invention is not limited in that respect since the number of second ribs 63 may be different from four and consequently the separation angle may be different from 90°.

Moreover, the selector of the valve interconnector 1 comprises a plurality of second mating ribs 64 axially protruding from the internal surface 85p of the exterior tube portion 85 of the base cap 8 beneath the respective one of second ribs 63. The second mating ribs 64 may be in one piece with the exterior tube portion 85 of the base cap 8. The second mating ribs 64 may be substantially equal to each other in shape and in size. Each one of the second mating ribs 64 may continuously extend substantially parallel to the central axis V from the bottom of the exterior tube portion 85 of the base cap 8 to the respective one of the second ribs 63. Alternatively, axial interruptions may separate the second mating ribs 64 from the second ribs 63. The second mating ribs 64 may be equally angularly spaced from each other. The second mating ribs 64 are optionally positioned substantially at the same height. The second mating ribs 64 are positioned at a height such that at least an axial portion of each of the second mating ribs 64 is at the same height of at least an axial portion of each of the first mating ribs 69, the height of the axial portions of the mating ribs 64 and 69 being measured from an exposed surface 7m of the neck 7 facing the base cap 8, the exposed surface 7m being in particular a surface of a flange 78 of the neck 7. Each one of the second mating ribs 64 includes a radially internal border 64z which may be angularly preceded by a cam surface 64q providing a smooth transition from the internal surface 85p of the exterior tube portion 85 of the base cap 8 to the radial internal border 64z. The shape of the cam surface 64q of each one of the second mating ribs 64 axially protruding from the internal surface 85p of the exterior tube portion 85 of the base cap 8 may be conjugated with the shape of the cam surface 69q of each one of the first mating ribs 69 axially protruding from the external surface 7p of the neck 7.

Again, the selector of the valve interconnector 1 further includes a plurality of weak spots 61 integral to the exterior tube portion 85 of the base cap 8, in particular obtained at the bottom of the exterior tube portion 85 of the base cap 8. The weak spots 61 are configured to act as weakening points promoting the breakage of the exterior tube portion 85 of the base cap 8 under predetermined circumstances. Especially such a configuration of the weak spots 61 is obtained by abruptly adopting at the weak spots 61 local reductions in the thickness of the exterior tube portion 85 of the base cap 8. The weak spots 61 may be substantially equal to each other in shape and in size. In particular, the thickness of the exterior tube portion 85 of the base cap 8 may be subjected to the same abrupt local reduction. Each one of the weak spots 61 may be associated to a respective one of the second ribs 63. In particular, each one of the weak spots 61 is angularly adjoining to a respective one of the second ribs 63. The weak spots 61 are optionally substantially equally angularly spaced from each other. Since the second ribs 63 are as well optionally substantially equally angularly spaced from each other, it follows that the angle separating each couple of consecutive weak spots 61 is substantially equal to an angle separating any couple of consecutive second ribs 63. Moreover, each one of the weak spots 61 may be associated to a respective one of the second mating ribs 64. In particular, each one of the weak spots 61 is angularly arranged roughly at the middle of a couple of consecutive second mating ribs 64, the angle separating each couple of consecutive weak spots 61 being substantially equal to an angle separating any couple of consecutive second mating ribs 64. FIGS. 11 to 13 show in particular that the weak spots 61 provided in the exterior tube portion 85 of the base cap 8 are in number of four and that the separation angle between each couple of consecutive weak spots is equal to 90°. However, it should be remarked that the third embodiment of the invention is not limited in that respect since the number of weak spots 61 may be different from four and consequently the separation angle may be different from 90°. Moreover, FIGS. 11 to 13 show that the separation angle between each one of the weak spots 61 and the respective one of the second mating ribs 64 is of the order of 45°. Again, it should be remarked that the third embodiment of the invention is not limited in that respect since the separation angle between the weak spots 61 and the second mating ribs 64 may be different from 45°.

In essence, the provision of the second ribs 63, of the second mating ribs 64 and of the weak spots 61 in the exterior tube portion 85 of the base cap 8 is intended to subdivide the bottom of the exterior tube portion 85 of the base cap 8 into a plurality of separable sectors, the weak spots 61 interspersed in the bottom of the exterior tube portion 85 of the base cap 8 providing releasable connections between consecutive separable sectors. The selector of the valve interconnector 1 is configured so that the axial alignment between the second mating ribs 64 and the first mating ribs 69 causes an irreversible breakage of the external tube portion 85 of the base cap 8 in correspondence of at least one of the weak spots 61. Such an irreversible breakage at the weak spots 61 may be facilitated by cut edges 38 provided at the bottom of the external surface 85s of the exterior tube portion 85 of the base cap 8 and arranged angularly past the weak spots 61. The cut edges 38 are configured to achieve local smooth reductions in the thickness of the exterior tube portion 85 of the base cap 8. Due to the cut edges 38, gaps 36 may be formed externally to the exterior tube portion 85 of the base cap 8, in particular between the external surface 85s of the exterior tube portion 85 of the base cap 8 and the internal surface 95p of the tube portion 95 of the code ring cap 9. The provision of the gaps 36 results to be effective in promoting the irreversible breakage of the external tube portion 85 of the base cap 8 at the weak spots 61 when the second mating ribs 64 are axially aligned with the first mating ribs 69 since the portions of the exterior tube portion 85 of the base cap 8 angularly preceding the weak spots 61 are allowed to bend outwards and consequently to exercise a tearing action on the weak spots 61.

The axial alignment between the second mating ribs 64 and the first mating ribs 69 is obtained by rotating the exterior tube portion 85 of the base cap 8 around the central axis V up to the radially internal border 64z of each of the second mating ribs 64 comes into contact with the radially external border 69z of each of the first mating ribs 69. The achievement of a contact condition between the radially internal border 64z of each of the second mating ribs 64 and the radially external border 69z of each of the first mating ribs 69 is facilitated by the cam surfaces 64q and 64z which are configured for guiding the second mating ribs 64 towards a complete alignment with the first mating ribs 69.

FIGS. 12 and 13 are respectively a cross-sectional view and a perspective view showing the valve interconnector 1 in accordance to the third embodiment of the invention when the selector of the valve interconnector 1 is in the first position, wherein it may be appreciated in particular that in the first position of the selector the second mating ribs 64 are axially misaligned with the first mating ribs 69. In other words, in the first position of the selector, each one of the second mating ribs 64 and the respective one of the first mating ribs 69 are separated by a predetermined angle. It should be remarked that the, even if FIG. 12 shows a separation angle between the mating ribs 64 and 69 of the order of 45°, the third embodiment of the invention is not limited in that respect since the predetermined angle separating the second mating ribs 64 from the first mating ribs 69 in the first position of the selector may be different from 45°. Since the exterior tube portion 85 of the base cap 8 and the neck 7 are secured to each other with ability of relative rotation about the central axis V, in order to toggle the position of the selector of the valve interconnector 1 from the first position to the second position and consequently in order to enable the base cap 8 to be axially released from the neck 7, the exterior tube portion 85 of the base cap 8 is rotated around the central axis V starting from the position of FIGS. 12 and 13, up to the position in which the mating ribs 64 and 69 are axially aligned to each other, which constitutes the second position of the selector of the valve interconnector 1. The axial alignment between the mating ribs 64 and 69 occurs when the radially internal borders 64z and 69z of mating ribs 64 and 69 come into contact, being facilitated by the sliding between the mating ribs 64 and 69 at the respective cam surfaces 64z and 69z. At the axial alignment between the mating ribs 64 and 69, the portions of the exterior tube portion 85 of the base cap 8 angularly preceding the weak spots 61 bend outwards and move into the gaps 36. Following the movement of such portions into the gaps 36, the external tube portion 85 of the base cap 8 breaks at the weak spots 61. The breakage of the external tube portion 85 of the base cap 8 at the weak spots 61 releases the second ribs 63 by the axial constraint represented by the first rib 68. Consequently, the base cap 8 may be axially released from the neck 7. It should be underlined that the breakage of the external tube portion 85 of the base cap 8 at the weak spots 61 definitively prevents the first position of the selector from being reinstated. From the above description, it may be appreciated in essence that in the third embodiment of the invention intentional breakages of the external tube portion 85 of the base cap 8 at specific points are implemented for toggling the position of the selector of the valve interconnector 1 from the first position to the second position and for preventing any subsequent reinstatement of the first position of the selector of the valve interconnector 1.

Finally, it is observed that the positioner of the valve interconnector 1 is depicted in FIGS. 4, 7 and 11 with the exactly the same configuration. Therefore, the operation of the positioner depicted in FIGS. 1 and 2 for providing permanent evidence of any toggling of the selector from the first position towards the second position may apply to each of the embodiments of the invention from the first embodiment to the third embodiment.

Assembly

Figure 14:
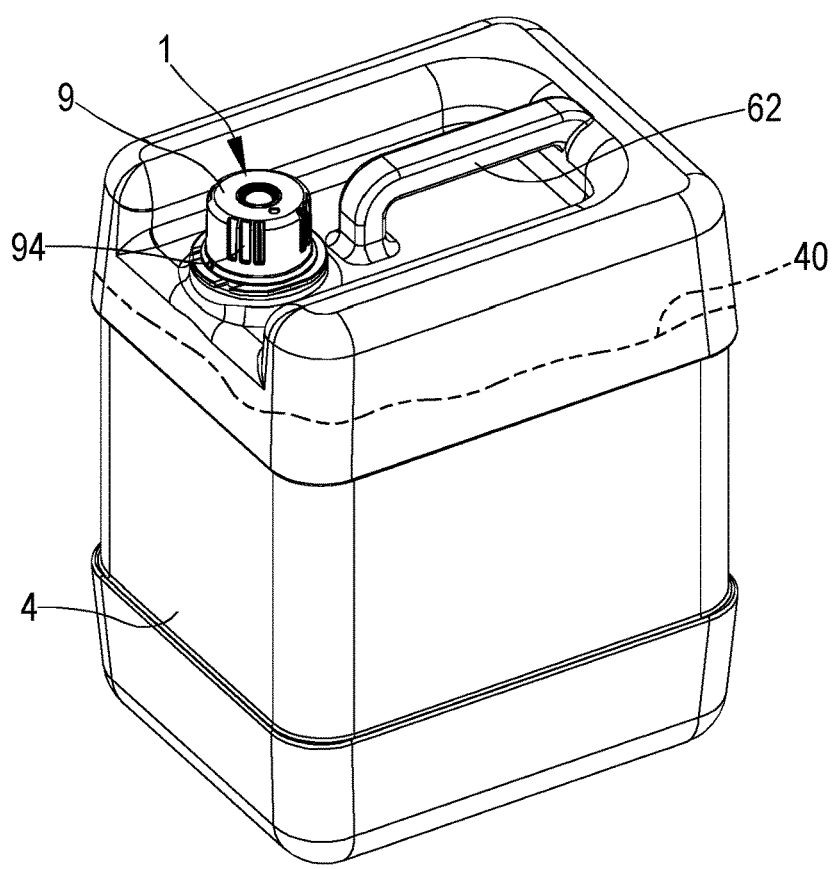
FIG. 14 is a perspective view of an assembly in accordance with aspects of the present invention comprising a valve interconnector and a hollow body.
Figure 15:
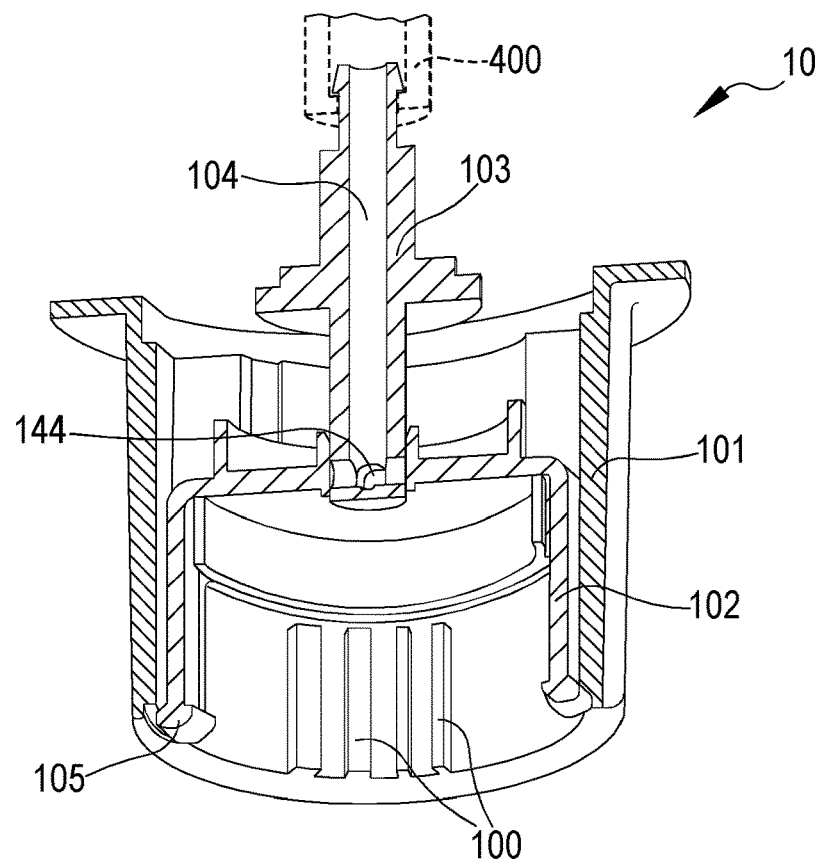
FIG. 15 is a perspective view of a receiver interconnector suitable for use in combination with a valve interconnector in an interconnector system in accordance with further aspects of the present invention.

FIG. 14 shows an assembly according to aspects of the present invention. The assembly comprises a hollow body 4, in particular a container, configured to hold liquids. The hollow body 4 may be made of plastics, in particular of a plastic material with adequate resistance to chemical agents. The hollow body 4 may be a one piece element. A handle 62 may be integrated into the structure of the hollow body 4 to facilitate transportation of the assembly. A through opening is provided in the hollow body 4 for putting the internal volume of the hollow body 4 into communication with the exterior. The through opening may be arranged above the maximum filling level of the hollow body 4. A chemical (e.g. a detergent) or other product is contained in the internal volume of the hollow body 4.

The assembly further comprises a valve interconnector 1 as described in the previous section of the present description. The valve interconnector 1 is arranged at the through opening of the hollow body 4, the passageway 77 of the valve interconnector 1 being in particular substantially coaxial to the through opening of the hollow body 4. The neck 7 of the valve interconnector 1 is fixedly secured to the hollow body 4. In particular, a flange of the hollow body 4 around the through opening is permanently sandwiched between the lower coupling retention flange 71 and the upper coupling retention flange 72, so that the tubular end portion 70 of the neck 7 projects from the hollow body 4. The valve interconnector 1 is easily accessible for performing operations, such as the coupling of the valve interconnector 1 to the receiver interconnector 10 and the toggling of the selector of the valve interconnector 1. Finally, it should be noted that the code ring cap 9 is clearly visible, so that it is possible to identify from the radial lugs or the radial channels 94 which chemical is contained in the hollow body 4 (to this regard, different colors may be envisaged for the code ring cap 9 in order to make such an identification of the chemical even more immediate).

Interconnector System

The valve interconnector 1 has the advantage that no modifications to existing receiver interconnectors are required. Therefore, for example, the interconnector system 1 may include, together with a valve interconnector 1 according to aspects of the invention, a receiver interconnector as described in patent document WO2016/138053A1, which is herein incorporated by reference. WO2016/138053A1 discloses the configuration of possible receiver interconnectors usable with the interconnector system 1 according to aspects of the present invention (for instance FIG. 5 of WO2016/138053A1 shows a receiver interconnector suitable for the interconnector system using valve interconnector 1).

A receiver interconnector 10 configured for use (in combination with the valve interconnector 1) in the interconnector system according to aspects of the present invention is shown in FIG. 15. For example, the receiver interconnector 10 configured for use in the interconnector system according to aspects of the present invention may comprise means for being secured to the second hollow body 400, a housing 101 having an internal volume for receiving the valve interconnector 1, a hollow post 103 protruding inside the housing 101 and a sleeve 102 arranged inside the housing 101 around the hollow post 103. The hollow post 103 has an internal passageway 104, at least an opening 144 being provided in the walls of the hollow post 103 to put the passageway 104 in communication with the exterior. The sleeve 102 is slidable along the hollow post 103 from an uncoupled position, taken when the receiver interconnector 10 is disconnected from the valve interconnector 1, to a coupled position, taken when the receiver interconnector 10 is connected to the valve interconnector 1.

The sleeve 102 may comprise at least one lock 105 configured for establishing at least an axial engagement between the receiver interconnector 10 and the valve interconnector 1 when the sleeve 102 is in the coupled position. A plurality of radial keyways 100 may axially extend along the internal surface of the housing 101 of the receiver interconnector 10 or along the internal surface of the sleeve 102 of the receiver interconnector 10 for mating engagement with the radial lugs or the radial channels 94 axially extending along the external surface 95s of the tube portion 95 of the code ring cap 9 of the valve interconnector 1.

Manufacturing Method

The present invention also concerns a method of manufacturing a valve interconnector suitable for use in an interconnector system. In particular, the method of manufacturing according to the invention is devised for obtaining the valve interconnector 1 as described below and as shown in attached FIGS. 1 to 14.

According to the invention, the method of manufacturing the valve interconnector 1 comprises steps i) to v). In step i), the valve assembly 5 is predisposed. In step ii), the valve assembly 5 is secured to the base cap 8. In step iii), the sealing ring 3 is arranged in the interior tube portion 85 of the base cap 8. In step iv), the code ring cap 9 is secured to the base cap 8, so that the sealing ring 3 remains retained in the sealing ring seat 2. In step v), the base cap 8 is secured to the neck 7.

Step i) provides for one end of the bias spring 57 to be inserted within the valve retainer 51. An effective guidance during the insertion of the end of the bias spring 57 within the valve retainer 51 is provided by the radially internal borders of the ribs 59 which lead the end of the bias spring 57 to the accommodation into its correct position within the valve retainer 51, i.e. adjacently to the passageway 53 of the valve retainer 51. Then, the valve stein 55 (integral to the valve head 54) may be inserted within the valve retainer 51 so that the bias spring 57 results to mounted around the valve stein 55 and the valve stein 55 is further accommodated in the passageway 53. At the end of step i), the valve head 54 is substantially coaxial to the valve retainer 51 and has the ability of moving around the central axis of the valve assembly 5 defined by the passageway 53 and the valve stein 55, the bias spring 57 having upper end and the lower end into contact with the valve head 54 and with the valve retainer 51 respectively and hence acting against possible movements of the valve head 54 towards the passageway 53.

Step ii) provides for the valve retainer 51 to be snap coupled to the base cap 8. In particular, such a snap coupling envisages the accommodation of the circumferential flange 52 protruding radially outwards from the upper edge of the valve retainer 51 into the corresponding circumferential groove 82 provided in the internal surface 87p of the intermediate tube 87 of the base cap 8. At the end of step ii), the valve assembly 5 is fixedly secured and substantially coaxial to the base cap 8. Moreover, the valve head 54 is housed within the valve seat 80 defined at the bottom of the interior tube portion 81 of the base cap 8 and is kept into sealing contact with the valve seat 80 by the thrust exerted by the bias spring 57.

Step iii) provides for the sealing ring 3 to be axially inserted into the interior tube portion 81 of the base cap 8. In particular, the sealing ring 3 may be inserted with its external surface 3*s* sliding along the external surface 81*p* of the base cap 8. Such an insertion may be facilitated by the external surface 3*s* of the sealing ring 3 and the external surface 81*p* of the base cap 8 being both frustonical and conjugated in shape. The insertion of the sealing ring 3 into the interior tube portion 81 of the base cap 8 terminates when the bottom lip 29 of the sealing ring 3 comes into tight contact with a surface of the interior tube portion 81 of the base cap 8 adjacent to the valve seat 80 and substantially orthogonal to the direction of insertion. At the end of step iii), the sealing ring 3 is housed inside the bottom portion of the sealing ring seat 2, i.e. inside the portion of the sealing ring seat 2 delimited by the interior tube portion 81 of the base cap 8. The surface of the interior tube portion 81 of the base cap 8 being into tight contact with the bottom lip 29 of the sealing ring 3 acts as bottom abutment surface for the sealing ring 3 and forms the bottom side 2*f* of the sealing ring seat 2. The bottom portion of the sealing ring seat 2 is open instead at the top, so that the engaging surface of the top lip 23 of the sealing ring 3 is axially reachable for being used to complete the retaining of the sealing ring 3 into the sealing ring seat 2.

Step iv) provides for the code ring cap 9 to be snap coupled to the base cap 8 by engaging the continuous or segmented rib 93 with the continuous or segmented groove 83 of the snap fitting. In particular, the ribs 93 protruding from the internal surface 95*p* of the tube portion 95 of the code ring cap 9 may be accommodated into the respective grooves 83 provided on the external surface 85*s* of the exterior tube portion 85 of the base cap 8 for having the code ring 9 fixedly secured to the base cap 8.

Moreover, step iv) provides for the sealing ring seat 2 to be delimited on the top side. To this regard, the head portion 99 of the code ring cap 9 comprises a top abutment surface which forms the top side 2*c* of the sealing ring seat 2 at the securing of the code ring cap 9 to the base cap 8. Hence, the sealing ring 3 may remain interposed between the bottom abutment surface of the sealing ring seat 2 (belonging to the interior tube portion 81 of the base cap 8) and the top abutment surface of the sealing ring seat 2 (belonging to the head portion 99 of the code ring cap 9). The top abutment surface may match the engaging surface of the top lip 23 of the sealing ring 3. Both surfaces may be frustoconical. The sealing ring seat 2 may be completed with the provision of its top portion, i.e. with the portion of the sealing ring seat 2 delimited by the head portion 99 of the code ring cap 9. Since the top portion of the sealing ring seat 2 is axially consecutive to the bottom portion of the sealing ring seat 2, the sealing ring 3 may be housed partly in the top portion of the sealing ring seat 2 and partly in the bottom portion of the sealing ring seat 2. The sealing ring seat 2 may vary in size along its axial extension and may present a maximum radial size at the interface between the bottom portion of the sealing ring seat 2 and the top portion of the sealing ring seat 2.

Step iv) also provides for the sealing ring 3 to be axially locked in the sealing ring seat 2. To this regard, the head portion 99 of the code ring cap 9 comprises a sealing ring enclosing portion configured for preventing the sealing ring 3 from axially exiting the sealing ring seat 2, even when stuck in use to the receiver interconnector 10. The sealing ring enclosing portion of the head portion 99 of the code ring cap 9 may be put into direct contact with the top lip 23 of the sealing ring 3. An engagement condition may be established between the top lip 23 the sealing ring 3 and the sealing ring enclosing portion of the head portion 99 of the code ring cap 9. Alternatively or in addition, an adhesion condition may be established between the top lip 23 the sealing ring 3 and the sealing ring enclosing portion of the head portion 99 of the code ring cap 9. At the end of step iv), the sealing ring 3 is retained within the sealing ring seat 2 with a noticeable positional stability, the sealing ring 3 being in particular prevented from unintentional movements out of the sealing ring seat 2 by the head portion 99 of the code ring cap 9.

Step v) provides for the intermediate tube 87 of the base cap 8 to be press-fitted into sealed engagement with the internal surface 7*p* of the neck 7. At the end of step v), the interior tube portion 81 of the base cap 8 is pressed radially inwards by the internal surface 7*p* of the neck 7, so that the valve assembly 5 (previously snap coupled to the interior tube portion 81 of the base cap 8) is supported in a stable and secure way.

According to the present invention, step v) provides for the exterior tube portion 85 of the base cap 8 to be coupled to the neck 7. In particular, the coupling between the exterior tube portion 85 of the base cap 8 and the neck 7 is a snap coupling involving a pushing of the base cap 8 along the axial direction. The exterior tube portion 85 of the base cap 8 may be positioned with a predetermined orientation with respect to the neck. To achieve the desired orientation of the exterior tube portion 85 of the base cap 8, the securing between the base cap 8 and the code ring cap 9 may be exploited. Optionally, desired orientation of the exterior tube portion 85 of the base cap 8 may be achieved by inserting the first lip 12 protruding downwards from the bottom surface 9*n* of the code ring cap 9 into the first positioning slot 15 provided in the flange 78 of the neck 7. More optionally, desired orientation of the exterior tube portion 85 of the base cap 8 may be achieved by inserting as well the second lip 18 protruding downwards from the bottom surface 9*n* of the code ring cap 9 into the second positioning slot 20 provided in the flange 78 of the neck 7.

According to the present invention, step v) provides for the selector to be positioned in the first position with ability of being toggled from the first position to the second position by rotating the exterior tube portion 85 of the base cap 8 about the central axis V of a predetermined angle. Desired positioning of the selector into the first position may be obtained through a pushing of the base cap 8 along the axial direction. Should the valve interconnector 1 be according to above first or second embodiments, the second ribs 49 integral to the exterior tube portion 85 of the base cap 8 are at least partially axially aligned with first ribs 48 of the neck 7 during the pushing of the base cap 8 along the axial direction. Should the valve interconnector 1 be according to above second embodiment, the pushing of the base cap 8 along the axial direction involves the bending of the first fin 11 and of the second fin 16 (optionally with orientation opposite to each other) and the receiving of the first fin 11 and the second fin 16 in a bent condition in the first recess 41 and in the second recess 46 respectively. Should the valve interconnector 1 be according to above third embodiment, the second mating ribs 64 integral to the exterior tube portion 85 of the base cap 8 axially misaligned with the first mating ribs 69 of the neck 7 during the pushing of the base cap 8 along the axial direction.

Operating Method

The present invention also relates to a method of operating a valve interconnector suitable for use in an interconnector system. In particular, the method of operating according to the invention is devised for releasing the base cap 8 from the neck 7 of the valve interconnector 1 as described below and as shown in attached FIGS. 1 to 14.

According to aspects of the invention, the method of operating the valve interconnector 1 comprises steps a) and b). In step a), the exterior tube portion 85 of the base cap 8 is rotated about the central axis V of a predetermined angle, so that the selector of the valve interconnector 1 is toggled from the first position to the second position. The predetermined angle of rotation of the exterior tube portion 85 of the base cap 8 about the central axis V for toggling the selector of the valve interconnector 1 from the first position to the second position may be between 30° and 120°, optionally substantially equal to 45°. In step b), the base cap 8 is pulled along the axial direction, so that the base cap 8 is taken away from the neck 7 and consequently all the components of the valve interconnector 1 (including the first hollow body 4 to which the neck 7 is secured) become enabled to be recycled.

The toggling of the selector of the valve interconnector 1 from the first position to the second position may involve peculiar characteristics depending on the valve interconnector 1 being according to the above described first embodiment, second embodiment or third embodiment. According to the first embodiment of the invention and to the second embodiment of the invention, when the selector of the valve interconnector 1 is in the first position, the second ribs 49 of the exterior tube portion 85 of the base cap 8 are axially aligned with the first ribs 48 of the neck 7, with the axial constraint between the ribs 48 and 49 preventing the base cap 8 from being axially released from the neck 7. The toggling of the selector of the valve interconnector 1 from the first position to the second position is obtained by rotating the exterior tube portion 85 of the base cap 8 with respect to the neck 7, up to reach (at a rotation equal to the toggling angle T shown in FIG. 6) the condition of axial alignment between the second interruptions 45 of the exterior tube portion 85 of the base cap 8 (i.e. the interruptions comprised between the second ribs 49) and the first ribs 48 of the neck 7. According to the third embodiment of the invention instead, when the selector of the valve interconnector 1 is in the first position, the second mating ribs 64 of the exterior tube portion 85 of the base cap 8 are axially misaligned with the first mating ribs 69 of the neck 7 (in particular angularly spaced from each other by a predetermined separation angle), with the axial constraint between the first rib 68 of the neck 7 and the second ribs 63 of the exterior tube portion 85 of the base cap 8 preventing the base cap 8 from being axially released from the neck 7. The toggling of the selector of the valve interconnector 1 from the first position to the second position is obtained by rotating the exterior tube portion 85 of the base cap 8 with respect to the neck 7, up to reach the condition of axial alignment between the mating ribs 64 and 69. The condition of axial alignment between the mating ribs 64 and 69 may correspond to the condition wherein the radially internal borders 64z and 69z of the mating ribs 64 and 69 come into reciprocal contact, such a contact condition being advantageously facilitated by a prior sliding of the mating ribs 64 and 69 at the respective cam surfaces 64z and 69z. At the axial alignment between the mating ribs 64 and 69, the external tube portion 85 of the base cap 8 breaks in correspondence of at least one of the weak spots 61. The breakage of the external tube portion 85 of the base cap 8 in correspondence of at least one of the weak spots 61 creates a condition wherein the axial constraint between the first rib 68 and the second ribs 63 is rendered ineffective, such a breakage condition being advantageously facilitated by a prior bending outwards of the portions of the exterior tube portion 85 of the base cap 8 angularly arranged past the weak spots 61, which move into the gaps 36 provided between the exterior tube portion 85 of the base cap 8 and the tube portion 95 of the code ring cap 9 and consequently exercise an unsustainable tension on the weak spots 61.

Advantageously, step a) may provide for an irreversible breakage or an irreversible deformation to be caused to at least one element of the neck 7 or to at least one element of the base cap 8 during the toggling of the selector of the valve interconnector 1 from the first position towards the second position, following which the first position of the selector is definitively prevented from being reinstated.

According to the second embodiment of the invention, in the first position of the selector of the valve interconnector 1, the first fin 11 and the second fin 16 protruding from the exposed surface 7m of the neck 7 facing the base cap 8 are received in a bent condition in the recesses 41 and 46 provided in the bottom surface 8n of the base cap 8, the bending of the first fin 11 and the bending of the second fin 16 being in directions opposite to each other. The rotation of the exterior tube portion 85 of the base cap 8 for toggling of the selector of the valve interconnector 1 from the first position towards the second position may cause the irreversible deformation and hence the partial severing of the first fin 11 protruding from the exposed surface 7m of the neck 7 facing the base cap 8 or of the second fin 16 protruding from the exposed surface 7m of the neck 7 facing the base cap 8 (depending on the anti-clockwise or clockwise direction of rotation of the exterior tube portion 85 of the base cap 8). In particular, one of the fins 11 and 16 bends backwards to the point of provoking the detachment of the respective tip portion. The root portion of the deformed and severed fin remains attached to the neck 7 with no possibilities of being received in the respective first recess. The reinstatement of the first position of the selector of the valve interconnector 1 is so definitively prevented. According to the third embodiment of the invention, the reinstatement of the first position of the selector of the valve interconnector 1 is definitively prevented instead by the breakage of the external tube portion 85 of the base cap 8 in correspondence of at least one of the weak spots 61.

Advantageously, step a) may, alternatively or in addition, provide for an irreversible breakage or an irreversible deformation be caused to at least one element of the code ring cap 9 during the toggling of the selector of the valve interconnector 1 from the first position towards the second position, following which permanent evidence is given of the occurred toggling of the selector from the first position to the second position.

According to the any of the embodiments of the invention, in the first position of the selector of the valve interconnector 1, the first lip 12 protruding downwards from the bottom surface 9n of the code ring cap 9 is positioned within the first positioning slot 15 provided in the flange 78 of the neck 7 arranged beneath the base cap 8. Optionally, the second lip 18 protruding downwards from the bottom surface 9n of the code ring cap 9 is positioned within the second positioning slot 20 provided in the flange 78 of the neck 7 arranged beneath the base cap 8. The rotation of the tube portion 95 of the code ring cap 9 (secured to the exterior tube portion

85 of the base cap 8) for toggling the selector of the valve interconnector 1 from the first position towards the second position may cause the lips 12 and 18 to be severed or irreversibly deformed at the interface between the tip portions 12y and 18y and the root portions 12x and 18x. In such a way, an irreversible and clearly perceptible (both to the sight and to the touch) mark of the occurred toggling of the selector is left on the valve interconnector 1.

Advantages

In accordance with one or more the aspects of the invention a valve interconnector is provided wherein the sealing ring exhibits a noticeable positional stability, in particular at the release of the receiver interconnector. The valve interconnector is thus able to guarantee comfort and ease of use, in particular in relation to coupling and decoupling operations between the valve interconnector and the receiver interconnector.

The valve interconnector according to one or more of the above aspects ensures a reliable sealing between all the components of the valve interconnector, both in its uncoupled configuration and in its coupled configuration with the receiver interconnector.

Aspects of the invention also provide for a valve interconnector wherein the operation of the valve assembly is improved, with particular regard to the guidance of the bias spring at the coupling between the valve interconnector and the receiver interconnector.

In accordance with certain aspects, the valve interconnector manufacturing process leads to a perfect positioning and a perfect securing of all the components of the valve interconnector, in particular of the sealing ring.

Furthermore, certain aspects of the valve interconnector enable recycling of all the components of the valve interconnector and of the first hollow body as well, in particular by allowing all the components made of a material other than plastic (e.g., the bias spring of the valve assembly) to be released from the valve interconnector and by allowing the first hollow body to be rinsed before the recycling.

The valve interconnector of one or more of the described aspects may also prevent the first hollow body from being filled with products different from the intended product, thereby increasing safety of the interconnector system as the products contained in the first hollow body are usually chemicals. Aspects of the invention provide a valve interconnector whose structure is able to increase still more significantly the safety of the interconnector system by leaving permanent evidence of possible tampering or possible tampering attempts. Additionally, in accordance with certain aspects, a valve interconnector is provided able to allow efficient recycling without impairing on the safety of the interconnector system.

Although the present invention has been described with reference to specific embodiments, it is to be understood that modifications and variations of the invention exist without departing from the principles and scope of the invention as defined in the appended claims, as those skilled in the art will readily understand.

The invention claimed is:

1. A valve interconnector, suitable for use in combination with a receiver interconnector to couple a first hollow body associated to the valve interconnector to a second hollow body associated to the receiver interconnector, comprising:
a neck configured to be secured to the first hollow body, a passageway being defined through the neck to allow fluid communication between the first hollow body and the second hollow body;
a base cap secured to the neck and comprising an interior tube portion extending into an end portion of the passageway, an exterior tube portion covering at least a portion of the external surface of the neck and a head portion extending from the interior tube portion to the exterior tube portion;
a valve assembly arranged in the passageway and secured to the base cap, the valve assembly being configured to assume at least a closed position and at least an open position, the fluid communication between the first hollow body and the second hollow body being disabled when the valve assembly is in the closed position and being enabled when the valve assembly is in the open position;
a sealing ring configured to provide a leak-proof connection between the valve interconnector and the receiver interconnector, the sealing ring being housed inside a sealing ring seat at least partially provided in the interior tube portion of the base cap and
a code ring cap secured to the base cap and comprising a tube portion covering at least a portion of the external surface of the exterior tube portion of the base cap and a head portion covering at least a portion of the external surface of the head portion of the base cap, the head portion of the code ring cap comprising a sealing ring enclosing portion configured to cooperate in retaining the sealing ring within the sealing ring seat.

2. The valve interconnector according to claim 1, wherein the sealing ring enclosing portion protrudes radially inward relative to the interior tube portion of the base cap and wherein the sealing ring enclosing portion extends about an end aperture of the interior tube portion of the base cap forming a continuous retaining lip axially locking the sealing ring.

3. The valve interconnector according claim 1, wherein the sealing ring seat has a bottom side, adjacent to the valve assembly, provided with a bottom abutment surface and on a top side, opposite to the bottom side, provided with a top abutment surface, the bottom abutment surface being formed by the interior tube portion of the base cap and the top abutment surface being formed by the sealing ring enclosing portion of the code ring cap, and
wherein the sealing ring comprises a bottom lip and a top lip, positioned at the opposite ends of the sealing ring, the top lip exhibiting an engaging surface matching the top abutment surface of the sealing ring seat.

4. The valve interconnector according to claim 3, wherein the sealing ring seat comprises a bottom portion internal to the interior tube portion of the base cap and a top portion axially consecutive to said bottom portion and internal to the sealing ring enclosing portion of the code ring cap, the sealing ring seat presenting maximum radial size at an interface between the bottom portion of the sealing ring seat and the top portion of the sealing ring seat, and
wherein the radial size of the sealing ring seat varies along an axial extension of the sealing ring seat.

5. The valve interconnector according claim 1, wherein the sealing ring and the sealing ring seat are configured for allowing the sealing ring to be axially compressed by the receiver interconnector during the coupling with the valve interconnector.

6. The valve interconnector according to claim 5, wherein the sealing ring enclosing portion of the code ring cap comprises a flange delimiting an aperture provided at the center of the head portion of the code ring cap, the aperture being configured to act as insertion aperture for the receiver interconnector.

7. The valve interconnector according to claim 5, wherein the head portion of the code ring cap comprises a plurality of linking rods connecting the sealing ring enclosing portion of the code ring cap with the tube portion of the code ring cap, the linking rods being substantially equally angularly spaced with each other.

8. The valve interconnector according claim 1, wherein one or more radial lugs or one or more radial channels axially extend along the external surface of the tube portion of the code ring cap and are configured to act as keys configured for mating engagement with corresponding keyways provided in the receiver interconnector; and wherein the code ring cap is fixedly secured to the base cap.

9. The valve interconnector according to claim 1, wherein the valve interconnector is provided with a snap fitting configured to allow the code ring cap to be secured to the base cap, the snap fitting being operative between the external surface of the exterior tube portion of the base cap and the internal surface of the tube portion of the code ring cap, and
wherein the snap fitting comprises:
at least one rib on one of the external surface of the exterior tube portion of the base cap and the internal surface of the tube portion of the code ring cap and
at least a groove, configured to receive said at least one rib, on the other of the external surface of the exterior tube portion of the base cap and the internal surface of the tube portion of the code ring cap.

10. The valve interconnector according to claim 1, wherein the valve assembly comprises a valve head and a valve retainer, the valve retainer being secured to the base cap, a valve stem integral to the valve head being accommodated in a passageway provided in the valve retainer, the valve stem being configured to establish a slidable coupling of the valve head with respect to the valve retainer and then to allow the position of the valve assembly to be changed reversibly between a closed position and an open position.

11. The valve interconnector according to claim 1, wherein the exterior tube portion of the base cap and the neck are secured to each other with ability of relative rotation about a central axis and wherein the valve interconnector comprises:
a selector operative between the neck and the exterior tube portion of the base cap and configured for assuming at least a first position and a second position, in the first position the base cap being prevented from being axially released from the neck, in the second position the base cap being enabled to be axially released from the neck, and
wherein the selector is configured for allowing it to be toggled from the first position to the second position when the exterior tube portion of the base cap is rotated about the central axis of a predetermined angle.

12. The valve interconnector according to claim 11, wherein the selector comprises:
a plurality of first ribs radially protruding from the external surface of the neck,
a plurality of first interruptions, each first interruption being interposed between any couple of consecutive first ribs,
a plurality of second ribs radially protruding from the internal surface of the exterior tube portion of the base cap, and
a plurality of second interruptions, each second interruption being interposed between any couple of consecutive second ribs, the second ribs being arranged at a lower height than the first ribs,
wherein in the first position of the selector the second ribs are at least partially axially aligned with the first ribs, whilst in the second position of the selector the second ribs are wholly axially aligned with the first interruptions.

13. The valve interconnector according to claim 12, wherein the neck includes a flange arranged beneath the base cap and the selector further includes at least a first fin and at least a second fin protruding upwards from the surface of the flange of the neck facing the base cap, the first fin and the second fin being both pliable and being received in a bent condition in respective recesses provided at the bottom of the exterior tube portion of the base cap, the selector being configured so that the toggling of the selector from the first position towards the second position causes the irreversible deformation and the partial severing of one between the first fin and the second fin, the deformation and the partial severing of one between the first fin and the second fin definitively preventing the first position of the selector from being reinstated.

14. The valve interconnector according to claim 11, wherein the selector comprises:
a first rib radially protruding from the external surface of the neck,
a plurality of first mating ribs axially protruding from the external surface of the neck beneath the first rib,
a plurality of second ribs radially protruding from the internal surface of the exterior tube portion of the base cap,
a plurality of second mating ribs axially protruding from the internal surface of the exterior tube portion of the base cap beneath the second rib, the second mating ribs being arranged at the same height of the first mating ribs,
a plurality of weak spots integral to the exterior tube portion of the base cap, at the weak spots the thickness of the exterior tube portion of the base cap being subjected to local abrupt reductions, each one of the weak spots being angularly adjoining to a respective one of the second ribs, and
wherein in the first position of the selector the second mating ribs are axially misaligned with the first mating ribs, whilst in the second position of the selector the second mating ribs are at least partly axially aligned with the first mating ribs.

15. The valve interconnector according to claim 11, wherein at least one lip protrudes downwards from a bottom surface of the code ring cap and at least one positioning slot is provided in a flange of the neck arranged beneath the base cap, said at least one lip penetrating into said at least one positioning slot, and
wherein a weakening plane crosses said at least one lip and subdivides a tip portion of the lip from a root portion of the lip and the positioner is configured for causing the tip portion of the lip to be severed or irreversibly deformed when the code ring cap is rotated about the central axis, for providing permanent evidence of the toggling of the selector from the first position towards the second position.

16. An assembly comprising a hollow body, a chemical contained in the hollow body and a valve interconnector according to claim 1, wherein the neck of the valve interconnector is secured to the hollow body.

17. An interconnector system comprising a valve interconnector according to claim 1 and a receiver interconnector, the receiver interconnector being configured to be secured to the second hollow body and comprising:

a housing having an internal volume for receiving the valve interconnector;

a hollow post protruding inside the housing and having an internal passageway, at least an opening being provided in the walls of the hollow post to put the passageway in communication with the exterior, and a sleeve arranged inside the housing around the hollow post and being slidable along the hollow post from an uncoupled position, taken when the receiver interconnector is disconnected from the valve interconnector, to a coupled position, taken when the receiver interconnector is connected to the valve interconnector.

\* \* \* \* \*